US011315255B2

(12) United States Patent
Kim et al.

(10) Patent No.: US 11,315,255 B2
(45) Date of Patent: *Apr. 26, 2022

(54) MIXING SEGMENTATION ALGORITHMS UTILIZING SOFT CLASSIFICATIONS TO IDENTIFY SEGMENTS OF THREE-DIMENSIONAL DIGITAL MODELS

(71) Applicant: ADOBE INC., San Jose, CA (US)

(72) Inventors: Vladimir Kim, Seattle, WA (US); Aaron Hertzmann, San Francisco, CA (US); Mehmet Yumer, San Jose, CA (US)

(73) Assignee: Adobe Inc., San Jose, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/907,663

(22) Filed: Jun. 22, 2020

(65) Prior Publication Data
US 2020/0320715 A1 Oct. 8, 2020

Related U.S. Application Data

(63) Continuation of application No. 15/487,813, filed on Apr. 14, 2017, now Pat. No. 10,706,554.

(51) Int. Cl.
*G06T 7/143* (2017.01)
*G06K 9/68* (2006.01)
(Continued)

(52) U.S. Cl.
CPC .......... *G06T 7/143* (2017.01); *G06K 9/00201* (2013.01); *G06K 9/34* (2013.01);
(Continued)

(58) Field of Classification Search
None
See application file for complete search history.

(56) References Cited

U.S. PATENT DOCUMENTS

| 9,928,448 B1 | 3/2018 | Merler et al. |
| 2007/0002043 A1* | 1/2007 | Guenter ................. G06T 17/20 345/420 |

(Continued)

OTHER PUBLICATIONS

Hu, Tangao et al. "Combination of hard and soft classification method based on adaptive threshold." 2014 IEEE Geoscience and Remote Sensing Symposium (2014): 4180-4183.
(Continued)

*Primary Examiner* — Jiangeng Sun
(74) *Attorney, Agent, or Firm* — Keller Preece PLLC

(57) ABSTRACT

The present disclosure includes methods and systems for identifying and manipulating a segment of a three-dimensional digital model based on soft classification of the three-dimensional digital model. In particular, one or more embodiments of the disclosed systems and methods identify a soft classification of a digital model and utilize the soft classification to tune segmentation algorithms. For example, the disclosed systems and methods can utilize a soft classification to select a segmentation algorithm from a plurality of segmentation algorithms, to combine segmentation parameters from a plurality of segmentation algorithms, and/or to identify input parameters for a segmentation algorithm. The disclosed systems and methods can utilize the tuned segmentation algorithms to accurately and efficiently identify a segment of a three-dimensional digital model.

20 Claims, 12 Drawing Sheets

(51) Int. Cl.
*G06K 9/34* (2006.01)
*G06K 9/00* (2006.01)
*G06T 7/11* (2017.01)

(52) U.S. Cl.
CPC ............... *G06K 9/685* (2013.01); *G06T 7/11* (2017.01); *G06T 2200/04* (2013.01); *G06T 2207/10028* (2013.01); *G06T 2207/20081* (2013.01)

(56) References Cited

U.S. PATENT DOCUMENTS

| | | | |
|---|---|---|---|
| 2007/0276225 | A1 | 11/2007 | Kaufman et al. |
| 2011/0119210 | A1 | 5/2011 | Zhang et al. |
| 2012/0106800 | A1 | 5/2012 | Khan et al. |
| 2014/0156659 | A1 | 6/2014 | Grokop et al. |
| 2014/0161334 | A1 | 6/2014 | Wang et al. |
| 2015/0022517 | A1* | 1/2015 | Jutan ............ G06T 13/40 345/419 |
| 2015/0110392 | A1* | 4/2015 | Wang ............ G06T 7/11 382/164 |
| 2015/0287211 | A1* | 10/2015 | Mundhenk ........ G06T 7/143 382/173 |
| 2018/0300882 | A1 | 10/2018 | Kim et al. |
| 2019/0196449 | A1* | 6/2019 | Zhang ............ G06T 19/20 |

OTHER PUBLICATIONS

Kalogerakis, Evangelos, Aaron Hertzmann, and Karan Singh. "Learning 3D mesh segmentation and labeling." ACM Transactions on Graphics (TOG) 29.4 (2010): 102.

Sidi, Oana, et al. Unsupervised co-segmentation of a set of shapes via descriptor-space spectral clustering. vol. 30. No. 6. ACM, 2011.

Srimal Jayawardena and Di Yang and Marcus Hutter, "3D Model Assisted Image Segmentation", Dec. 2011.

Yumer, M. Ersin, Won Chun, and Ameesh Makadia. "Co-segmentation of textured 3D shapes with sparse annotations." 2014 IEEE Conference on Computer Vision and Pattern Recognition. IEEE, 2014.

U.S. Appl. No. 15/487,813, Oct. 12, 2018, Office Action.
U.S. Appl. No. 15/487,813, May 10, 2019, Office Action.
U.S. Appl. No. 15/487,813, Sep. 17, 2019, Office Action.
U.S. Appl. No. 15/487,813, Feb. 27, 2020, Notice of Allowance.

* cited by examiner

MIXING SEGMENTATION ALGORITHMS UTILIZING SOFT CLASSIFICATIONS TO IDENTIFY SEGMENTS OF THREE-DIMENSIONAL DIGITAL MODELS

CROSS-REFERENCE TO RELATED APPLICATIONS

The present application is a continuation of U.S. application Ser. No. 15/487,813, filed on Apr. 14, 2017. The aforementioned application is hereby incorporated by reference in its entirety.

BACKGROUND

Recent years have seen rapid technological development in three-dimensional digital modeling. Indeed, in light of advancements in hardware and software, computing systems can now generate and manipulate three-dimensional digital models representing various object types having diverse formation and shape properties. For example, it is now common for individuals and businesses to generate three-dimensional digital models of machining parts, abstract shapes, cars, animals, or people.

Although conventional modeling systems can generate and manipulate three-dimensional digital models, such systems have a number of shortcomings. For example, users utilizing three-dimensional digital models often need to select and manipulate different segments of the digital model (e.g., select and modify a portion of a car represented in a digital model). Many conventional modeling systems are unable to accurately identify (e.g., select and then manipulate) segments of three-dimensional digital models across a wide array of model types. For example, some modeling systems may be capable of identifying segments of a particular category of industrial parts having common characteristics, but those same modeling systems are not capable of identifying segments of other three-dimensional digital model types or industrial parts that are outside the particular category. Accordingly, users express frustration with conventional modeling systems as segment selection capability and accuracy drastically varies from one three-dimensional digital model to the next.

Furthermore, in order to identify components of a three-dimensional digital model, conventional modeling systems require significant memory, processing power, and time. To illustrate, a user seeking to select a portion of a three-dimensional digital model of a car utilizing a conventional modeling system can often experience significant delays as the modeling system utilizes inefficient algorithms and/or parameters to analyze the three-dimensional digital model and identify a segment of the three-dimensional model that corresponds to the selected portion. In addition, because some conventional systems are not capable of segmenting a particular three-dimensional model (or are not capable of segmenting a particular three-dimensional model accurately) conventional systems frequently utilize excessive computing resources, as users repeatedly apply a segmentation analysis in an attempt to generate a useful segmentation result. Further, inaccurate segmentation results generated by conventional systems can lead to corruption or errors in a three-dimensional model, which can result in losses in data and productivity.

These and other problems exist with regard to segmenting components in a three-dimensional digital model.

BRIEF SUMMARY

One or more embodiments of the present disclosure provide benefits and/or solve one or more of the foregoing or other problems in the art with systems and methods that determine a soft classification of a three-dimensional digital model and utilize the soft classification to accurately and efficiently identify segments of the three-dimensional digital model. For example, the disclosed systems and methods determine a soft classification category for a three-dimensional digital model and select a segmentation algorithm, and/or define an input parameter for a segmentation algorithm, that corresponds to the soft classification category. Indeed, in one or more embodiments, the disclosed systems and methods determine a soft classification of a three-dimensional digital model, utilize a plurality of segmentation algorithms (e.g., mixture of experts parameter tuning) to generate segmentation parameters, and then combine the segmentation parameters according to the soft classification to accurately identify a segment of a three-dimensional digital model.

By identifying and utilizing a soft classification of a three-dimensional digital model, the disclosed systems and methods improve the accuracy and the efficiency of identifying segments of the three-dimensional digital model. Indeed, the disclosed systems and methods utilize a soft classification to select algorithms, combine algorithm segmentation parameters, or identify input parameters that are uniquely suited to particular features of three-dimensional digital models, which provides a significant increase in segmentation accuracy. Moreover, by generating a soft classification using a pre-trained soft classification algorithm, the disclosed systems and methods can also efficiently select algorithms or input parameters, thus reducing the time and computing power required to accurately identify components within a three-dimensional digital model.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings in which.

DETAILED DESCRIPTION

Figure 1:
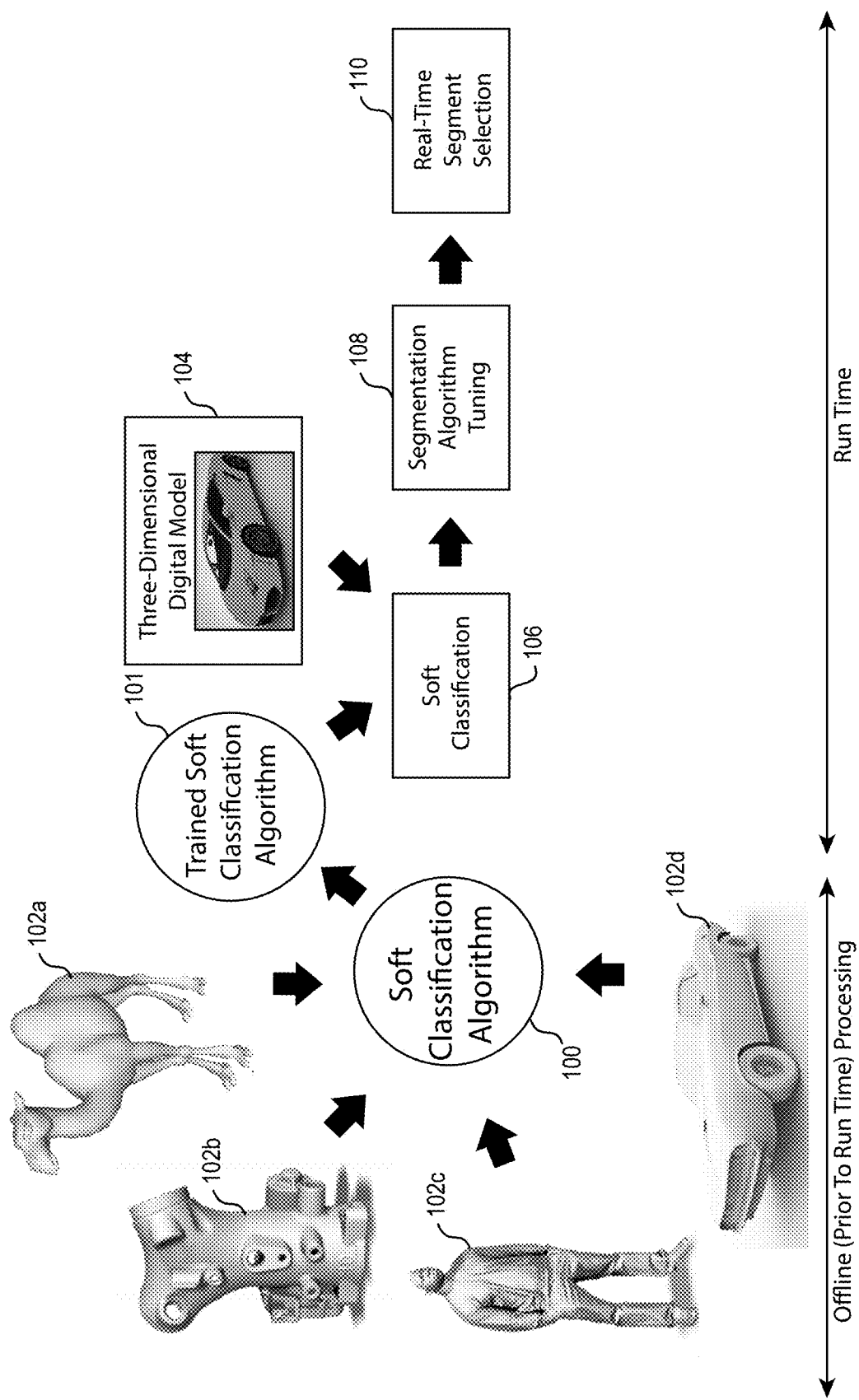
FIG. 1 illustrates a representation of real-time segment selection of a three-dimensional digital model based on a soft classification in accordance with one or more embodiments.

One or more embodiments of the present disclosure include a digital segmentation system. In particular, in one or more embodiments, the digital segmentation system identifies a soft classification corresponding to a three-dimensional digital model and utilizes the soft classification to identify a segment of the three-dimensional digital model. For example, the digital segmentation system can determine a soft classification corresponding to a digital model and then utilize the soft classification to select one or more segmentation algorithms and/or one or more input parameters to utilize in identifying a segment of the digital model. Moreover, in one or more embodiments, the digital segmentation system utilizes a soft classification to select segmentation algorithms and then combine segmentation parameters from the segmentation algorithms (e.g., a mixture of experts tuning approach to generating mixed segmentation parameters). The digital segmentation system then utilizes the mixed segmentation parameters to identify a segment of the digital model.

To illustrate, in one or more embodiments, the digital segmentation system determines a soft classification corresponding to a three-dimensional digital model by analyzing features of the three-dimensional digital model based on a plurality of training digital models and training soft classification categories. Moreover, the digital segmentation system selects a segmentation algorithm from a plurality of segmentation algorithms based on the determined soft classification for the three-dimensional digital model. Upon the digital segmentation system receiving an indication of a selection of a portion of the three-dimensional digital model (e.g., a user selection), the digital segmentation system utilizes the selected segmentation algorithm to identify a segment of the three-dimensional digital model corresponding to the selected portion of the three-dimensional model.

Moreover, and as mentioned, in one or more embodiments, the digital segmentation system utilizes a soft classification algorithm to determine one or more soft classifications corresponding to a three-dimensional digital model. More specifically, in one or more embodiments, the digital segmentation system generates a soft classification that comprises a plurality of probabilities that a three-dimensional digital model corresponds to a plurality of soft classification categories. The digital segmentation system can then utilize these probabilities to tune segmentation algorithms and select a segment of the three-dimensional digital model.

For example, in one or more embodiments, the digital segmentation system utilizes the probabilities corresponding to soft classification categories to select one or more segmentation algorithms. In particular, the digital segmentation system can determine a correspondence between a soft classification category and a segmentation algorithm (e.g., that a segmentation algorithm is more accurate with regard to a particular soft classification category). The digital segmentation system can then utilize the probabilities together with the determined correspondence to select a segmentation algorithm to apply in identifying a segment of the three-dimensional digital model.

Similarly, the digital segmentation system can also utilize the probabilities corresponding to soft classification categories to select and combine classification algorithms. In particular, in one or more embodiments, the digital segmentation system selects classification algorithms that correspond to probabilities that exceed a probability threshold. The digital segmentation system then utilizes the selected classification algorithms to generate segmentation parameters (e.g., parameters utilized to identify a segment in a three-dimensional digital model). The digital segmentation system mixes the segmentation parameters based on the probabilities from the soft classification. Specifically, the digital segmentation system generates mixture coefficients based on the probabilities from the soft classification to generate mixed segmentation parameters. The digital segmentation system can then utilize the mixed segmentation parameters to identify segments of the three-dimensional digital model.

In addition, the digital segmentation system can also utilize the probabilities to determine input parameters for a segmentation algorithm. In particular, the digital segmentation system can determine a correspondence between soft classification categories and input parameters. The digital segmentation system can then utilize the probabilities from a soft classification together with the determined correspondence to set input parameters that allow one or more segmentation algorithms to function more accurately in relation to a particular three-dimensional digital model.

Based on the above principles and features, which will be explained in further detail below, the digital segmentation system provides a number of advantages over conventional modeling systems. For instance, the digital segmentation system can accurately identify, select, and manipulate segments of a wide variety of three-dimensional digital models having diverse features and characteristics. In particular, by selecting one or more segmentation algorithms based on a soft classification, the digital segmentation system tunes segmentation algorithms more precisely to the given features and characteristics of a particular three-dimensional digital model. Accordingly, compared to conventional systems, the digital segmentation system provides significantly more precise segmentation results for three-dimensional models by customizing the segmentation algorithms to the particular features and characteristics of each three-dimensional model.

In addition, the digital segmentation system can accurately identify and manipulate segments of a three-dimensional digital model while improving performance of computing devices implementing the digital segmentation system. For example, by utilizing a pre-trained soft classification algorithm, the digital segmentation system can quickly identify a soft classification corresponding to a three-dimensional digital model to identify algorithms that efficiently and accurately identify segments of a particular category of three-dimensional digital models. Furthermore, in one or more embodiments, the digital segmentation system utilizes the soft classification to limit the number of software algorithms utilized to identify a segment of a three-dimensional digital model. To illustrate, the digital segmentation system can apply probability thresholds that identify segmentation algorithms most likely to produce accurate results, while avoiding the processing burden resulting from applying excessive segmentation algorithms that produce inaccurate results, or that are unlikely to produce accurate results. Furthermore, the digital segmentation system can identify and apply more accurate segmentation algorithms and/or parameters. reducing repetitive segmentation requests as well as errors/corruption in three-dimensional models and corresponding files.

Turning now to FIG. 1, additional detail will be provided regarding identifying segments of a three-dimensional digital model based on a soft classification. In particular, FIG. 1 illustrates a representation of utilizing a soft classification algorithm 100 to generate a real-time segment selection 110 of a three-dimensional digital model 104. More specifically, after training the soft classification algorithm 100 with training digital models 102a-102d, the digital segmentation system utilizes the trained soft classification algorithm 101 to generate a soft classification 106 of the three-dimensional digital model 104 (i.e., determine one or more soft classification categories) and utilizes the soft classification 106 to perform a segmentation algorithm tuning 108 and real-time segment selection 110.

As used herein, the term "three-dimensional digital model" refers to a digital representation of a three-dimensional object. In particular, a three-dimensional digital model includes a digital mesh, point cloud, or surface in three-dimensional space that portrays a person, place, or thing. For example, a three-dimensional digital model includes a plurality of digital points in three-dimensional space connected by digital elements. To illustrate, a three-dimensional digital model includes a plurality of digital vertices in three-dimensional space connected by edges (i.e., line segments) forming polygons (e.g., triangles or squares). Thus, in relation to FIG. 1, the three-dimensional digital model 104 comprises a digital mesh of a car. More specifically, the three-dimensional digital model 104 comprises a plurality of vertices connected by edges defining a plurality of surfaces of a car.

As used herein, the term "soft classification category" refers to an organization of three-dimensional digital models based on features and characteristics of three-dimensional digital models. For example, the term soft classification category reflects a type of three-dimensional digital model. To illustrate, in one or more embodiments, the term soft classification category includes an industrial category, an organic category (i.e., a category of models that reflect organic objects, such as models of animals or plants), a low fidelity scan category, or a user-designed shape category (i.e., a category of models that reflect user designs, such as models of artistic shapes or drawn shapes). Different embodiments can utilize different soft classification categories (e.g., a stylized category or high-density category), a smaller number of soft classification categories (e.g., two categories, such as mechanical and organic), or a larger number of soft classification categories (e.g., five or more). Soft classification categories need not be mutually exclusive. For example, a three-dimensional digital model may reflect an industrial model that results from a low fidelity scan, and thus corresponds to the industrial category and the low fidelity scan category. Similarly, a soft classification category may be defined by combining features and attributes of two or more categories to create a combination soft classification category.

As used herein, the term "soft classification" refers to a categorization of a three-dimensional digital model into one or more categories. In particular, the term soft classification refers to a categorization of a three-dimensional digital model into one or more soft classification categories. A soft classification can include determining one or more probabilities that a three-dimensional digital model corresponds to one or more soft classification categories. For example, a soft classification can include determining that a three-dimensional digital model is 90% likely to correspond to a first soft classification category and 10% likely to correspond to a second soft classification category. As used herein, the term "probability" refers to any representation of a likelihood. Thus, probability need not be expressed in terms of a percentage, but can include any score, measure, or parameter that reflects a likelihood (e.g., a likelihood that a three-dimensional digital model corresponds to a soft classification category).

Additionally, the term "soft classification algorithm," as used herein, refers to a collection of digital instructions for determining a soft classification corresponding to a three-dimensional digital model. For example, in one or more embodiments, the soft classification algorithm includes a machine learning algorithm that analyzes attributes or features of a three-dimensional digital model to determine a corresponding soft classification. For instance, the soft classification algorithm can include a mixture of experts algorithm, a neural network, a decision tree, or a naive Bayes algorithm.

For example, in relation to FIG. 1, the digital segmentation system trains the soft classification algorithm 100 based on training digital models 102a-102d. In particular, the digital segmentation system provides the training digital models 102a-102d together with a training soft classification category corresponding to each of the training digital models 102a-102d. The training digital models 102a-102d are representative of different classification categories, and accordingly, in one or more embodiments, the digital segmentation system trains the soft classification algorithm 100 using multiple training digital models 102a-102d in each of the classification categories. In this manner, the digital segmentation system trains the soft classification algorithm 100 to identify attributes, features, and characteristics of three-dimensional digital models that indicate a particular soft classification category.

The trained soft classification algorithm 101 can analyze a variety of attributes, features, and characteristics of a three-dimensional digital model. For example, in one or more embodiments, the digital segmentation system extracts light field descriptors from a three-dimensional digital model and analyzes the light field descriptors. Moreover, in one or more embodiments, the trained soft classification algorithm 101 analyzes shapes, densities (e.g., density of points, vertices, or edges), curvature, sharpness, or other attributes at varying levels of abstraction.

As shown, in one or more embodiments, the digital segmentation system trains the soft classification algorithm 100 offline (e.g., prior to run time, when a user seeks to identify a segment of a three-dimensional digital model). Thus, for example, the digital segmentation system can train the soft classification algorithm 100 in advance and then utilize the trained soft classification algorithm 101 at run time (e.g., at the time of initiating a software application with segmentation capabilities, upon initiating a tool for segmenting a three-dimensional digital model, or in response to receiving an indication of a selection by a user of a portion of a three-dimensional digital model).

For instance, as illustrated in FIG. 1, at run time, the digital segmentation system receives the three-dimensional digital model 104 (and/or a selection of a portion of the three-dimensional digital model 104). The digital segmentation system utilizes the trained soft classification algorithm 101 to generate the soft classification 106 corresponding to the three-dimensional digital model 104. In particular, the digital segmentation system utilizes the trained soft classification algorithm 101 that was previously trained based on the target digital models 102a-102d (and corresponding target soft classification categories) to generate the soft classification 106 corresponding to the three-dimensional digital model 104.

Upon determining the soft classification 106, the digital segmentation system performs the segmentation algorithm tuning 108. In particular, the digital segmentation system selects a segmentation algorithm (and/or corresponding segmentation parameters) utilizing the soft classification 106. For example, the segmentation algorithm tuning 108 can comprise selecting, based on the probabilities from the soft classification 106, a particular segmentation algorithm from a plurality of segmentation algorithms, combining segmentation parameters from a plurality of segmentation algorithms, or determining input parameters for one or more segmentation algorithms.

As used herein, the term "segmentation algorithm" refers to a collection of digital instructions for segmenting a three-dimensional digital model. In particular, a segmentation algorithm includes a collection of digital instructions that allocates, segregates, or assigns two or more subparts of a three-dimensional digital model into two or more segments. In addition, a segmentation algorithm can include an algorithm that determines surface properties or Gaussians of a three-dimensional digital model that are utilized to segregate a three-dimensional digital model into two or more segments.

In some embodiments, a segmentation algorithm includes an algorithm that generates one or more segmentation parameters based on an analysis of a three-dimensional digital model. As used herein, the term "segmentation parameter" refers to a measure, score, or quantity generated by a segmentation algorithm to identify a segment of a three-dimensional digital model. For example, a segmentation algorithm includes an algorithm for generating segmentation parameters that include edge segmentation scores (e.g., edge costs or edge cutabilities) that indicate edges to cut in a three-dimensional digital model in identifying one or more segments.

Moreover, the term "input parameters," as used herein, refers to measures utilized by a segmentation algorithm. In particular, the term "input parameters" refers to quantities or values provided as input to a segmentation algorithm. Different segmentation algorithms utilize different input parameters to adjust sensitivity, edge cost, thresholds or other factors utilized to identify a segment of a three-dimensional digital model. To illustrate, many segmentation algorithms analyze differences between surface normal directions in determining segments in a three-dimensional digital model and include one or more input parameters that adjust the significance of a change in surface normal directions in determining a segment.

As used herein, the term "segment" refers to a subpart of a three-dimensional digital model. In particular, for a three-dimensional model comprising a plurality of elements (e.g., points in a point cloud or vertices in a mesh), the term segment refers to a subpart of the plurality of elements. For example, in relation to a three-dimensional digital model that comprises a polygonal mesh with a plurality of vertices connected by a plurality of edges, a segment would include a subpart of the plurality of vertices (and/or a subpart of the plurality of edges). To illustrate, in one or more embodiments, the digital segmentation system identifies a segment by cutting (i.e., segregating) a three-dimensional digital model along edges. A segment includes a subpart of the three-dimensional digital model that is connected after cutting the edges. Thus, segments of a three-dimensional digital model of a car would include a tire, a fender, a rear-view mirror, etc.

In relation to FIG. 1, the digital segmentation system performs the segmentation algorithm tuning 108 by utilizing a plurality of segmentation algorithms. Specifically, the digital segmentation system utilizes the soft classification 106 to tune the plurality of segmentation algorithms. For example, the digital segmentation system analyzes probabilities from the soft classification 106 to select a subset of segmentation algorithms from the plurality of segmentation algorithms. The digital segmentation system then utilizes the probabilities from the soft classification 106 to select input parameters for the subset of segmentation algorithms. Moreover, the digital segmentation system utilizes the segmentation algorithms (e.g., with the input parameters) to identify segmentation parameters (e.g., edge segmentation scores) corresponding to the three-dimensional digital model 104. The digital segmentation system then combines the segmentation parameters based on the probabilities resulting from the soft classification 106.

Based on the segmentation algorithm tuning 108, the digital segmentation system then identifies the real-time segment selection 110. In particular, the digital segmentation system identifies a segment of a three-dimensional digital model corresponding to a portion of the three-dimensional digital model selected by a user. Specifically, the digital segmentation system receives user input of a selection of a portion of a three-dimensional digital model. Utilizing the segmentation algorithm tuning 108, the digital segmentation system then identifies a segment of the three-dimensional digital model corresponding to the portion selected by the user. The digital segmentation system then allows the user to modify the identified segment. For example, the digital segmentation system can move, re-orient, render, change colors, change shape (e.g., stretch, shrink, or distort), or otherwise modify the identified segment of the three-dimensional digital model.

To further reduce processing requirements, in one or more embodiments, the digital segmentation system also identifies symmetrical or repetitive patterns in a three-dimensional digital model. For example, upon performing the segmentation algorithm tuning 108, the digital segmentation system can analyze the three-dimensional digital model for global symmetries in the digital model (e.g., a left rear-view mirror symmetrical to a right rear-view mirror) and repetitive shapes (e.g., a tire that is identical to another tire). By identifying symmetrical and repetitive shapes, the digital segmentation system can identify a plurality of corresponding segments without duplicating processing requirements. For example, if a user selects a tire of a three-dimensional digital car model, the digital segmentation system can automatically identify three additional tires and provide an option to the user for selecting the three additional tires.

By utilizing the soft classification 106 to perform the segmentation algorithm tuning 108, the digital segmentation system can more accurately and efficiently identify the real-time segment selection 110. Indeed, the digital segmentation system can uniquely tune analysis of the three-dimensional digital model by selecting algorithms, identifying input parameters, and combining segmentation parameters based on the soft classification. This results in generating an accurate real-time segment selection 110 with efficient utilization of computing resources.

As mentioned previously, in one or more embodiments, the digital segmentation system trains a soft classification algorithm to generate soft classifications. In particular, the digital segmentation system can train a soft classification algorithm utilizing training digital models and training soft classification categories. For example, FIG. 2 illustrates training a soft classification algorithm in accordance with one or more embodiments.

Figure 2:
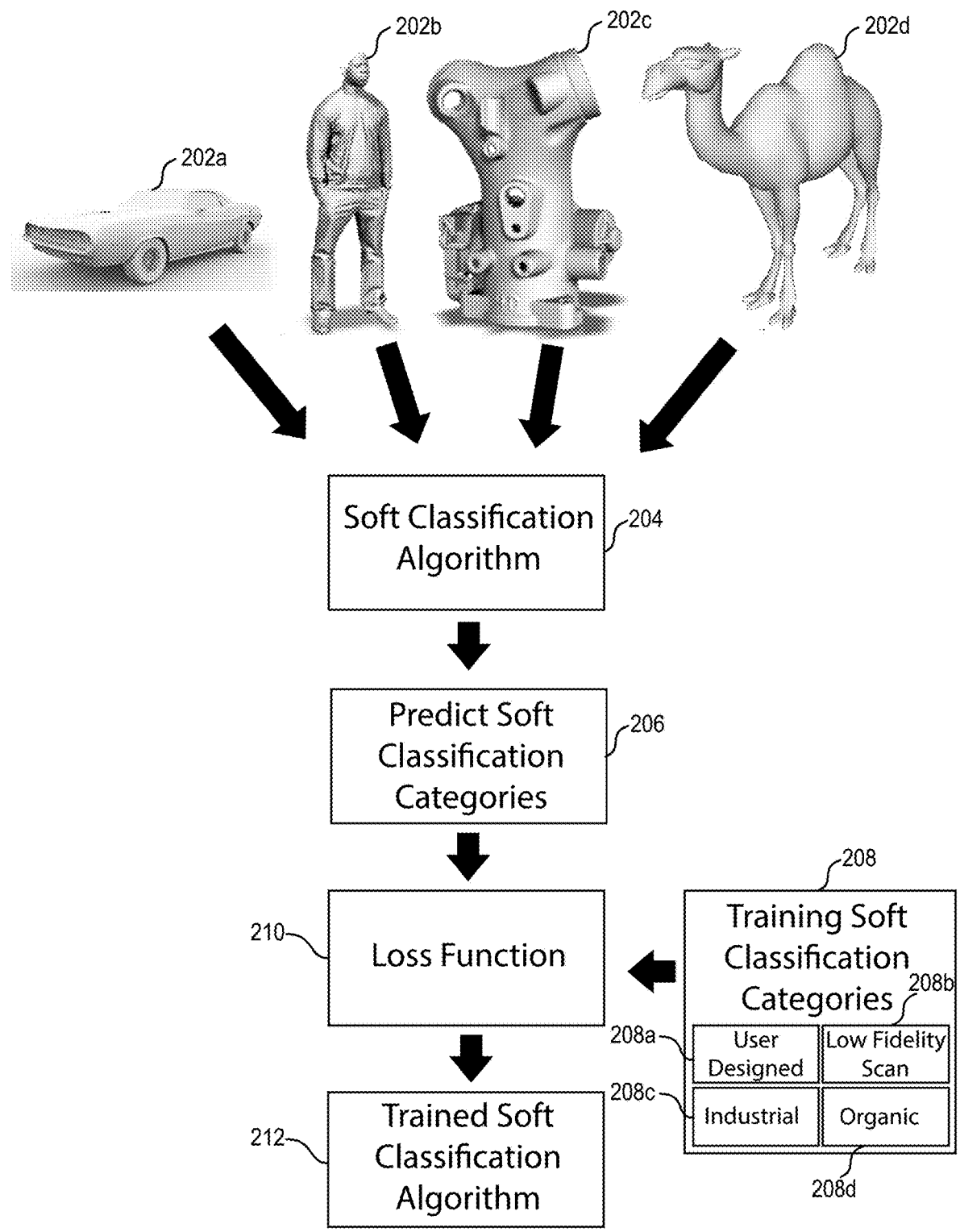
FIG. 2 illustrates a representation of training a soft classification algorithm in accordance with one or more embodiments.

In particular, FIG. 2 illustrates a plurality of training digital models 202a-202d. As used herein, the term "training digital model" refers to a three-dimensional digital model utilized to train an algorithm (e.g., a soft classification algorithm) or determine a correspondence between factors. Specifically, the term training digital model includes a three-dimensional digital model provided to a soft classification algorithm to train the soft classification algorithm to generate a soft classification. Similarly, as used herein the term "training soft classification category" refers to a known soft classification category corresponding to a training digital model. In particular, a training soft class classification category includes one or more known soft classification categories corresponding to a three-dimensional digital model utilized to train an algorithm (e.g., a three-dimensional digital model known to belong to an industrial soft classification category utilized to train a soft classification algorithm).

As shown in FIG. 2, the digital segmentation system provides the training digital models 202a-202d to a soft classification algorithm 204 (e.g., the soft classification algorithm 100). In one or more embodiments, providing the training digital models 202a-202d comprises determining one or more features of the training digital models 202a-202d, and providing the one or more features to the soft classification algorithm 204. For example, in one or more embodiments, the digital segmentation system processes the three-dimensional digital models 202a-202d to identify light field descriptors corresponding to each of the three-dimensional digital models 202a-202d. In one or more embodiments, the digital segmentation system identifies light field descriptors as described by Ding-Yun Chen, Xiao-Pei Tian, Yu-Te Shen, & Ming Ouhyoung, *On Visual Similarity Based 3D Model Retrieval*, EUROGRAPHICS, Vol. 22, No. 3 (2003), which is incorporated herein by reference. The digital segmentation system then provides the light field descriptors to the soft classification algorithm.

Moreover, as shown in FIG. 2, the digital segmentation system utilizes the soft classification algorithm 204 to predict soft classification categories 206. In particular, the soft classification algorithm predicts soft classification categories 206 corresponding to each of the training digital models 202a-202d (e.g., based on the light field descriptors corresponding to each of the training digital models 202a-202d). For example, the soft classification algorithm can predict that the training digital model 202a corresponds to an industrial soft classification category.

The predicted soft classification categories 206 can comprise one or more soft classification categories for each of the training digital models 202a-202d. For example, the predicted soft classification categories 206 can include probabilities that a particular digital model corresponds to one or a plurality of soft classification categories. To illustrate, the soft classification algorithm 204 can predict that the training digital model 202b has a 50% probability of belonging to an organic soft classification category and a 50% probability of belonging to a user-designed soft classification category.

As shown in FIG. 2, the digital segmentation system trains the soft classification algorithm 204 by comparing the predicted soft classification categories 206 with training soft classification categories 208. The training soft classification categories 208 comprise known training soft classification categories 208a-208d corresponding to the training digital models 202a-202d. Indeed, as shown, the training soft classification category 208a (user designed) corresponds to the training digital model 202a (i.e., a user-designed car), the training soft classification category 208b (low fidelity scan) corresponds to the training digital model 202b (e.g., a scanned model of a person), the training soft classification category 208c (industrial) corresponds to the training digital model 202c (e.g., a model of a machine part), the training soft classification category 208d (organic) corresponds to the training digital model 202d (e.g., a model of a camel). The digital segmentation system then compares the predicted soft classification categories 206 with the training soft classification categories 208 to train the soft classification algorithm.

Although FIG. 2 illustrates a single training soft classification corresponding to a single training digital model, based on the disclosure herein, it is appreciated that the digital segmentation system can also utilize multiple training soft classifications (e.g., percentages and/or probabilities) for each training digital model. For example, the digital segmentation system can indicate that a training digital image is 60% low fidelity scan and 40% organic. The digital segmentation system can then compare the training soft classification categories (e.g., the percentages and/or probabilities) with the predicted soft classifications (e.g., probabilities predicted by the soft classification algorithm 204).

As shown in FIG. 2, the digital segmentation system compares the predicted soft classifications 206 and the training soft classification categories by generating a loss function 210. The loss function 210 comprises a function that measures the difference between the predicted soft classification categories 206 and the training soft classification categories 208. For example, the loss function 210 can measure a difference in categories or a difference in probabilities between the predicted soft classification categories 206 and the training soft classification categories 208. For example, the loss function 210 can measure cosine distance or some other loss between the predicted soft classification categories 206 and the training soft classification categories 208.

As illustrated in FIG. 2, the digital segmentation system utilizes the loss function 210 to train the soft classification algorithm 204 (i.e., generate the trained soft classification algorithm 212). In particular, based on the comparison between the predicted soft classification categories 206 and the training soft classification categories 208 (i.e., based on the loss function 210), the soft classification algorithm 204 can learn to identify attributes and factors that correspond to particular soft classifications. By repeatedly analyzing training digital models, predicting soft classifications, and comparing predicted soft classifications with training soft classifications, the soft classification algorithm can learn to identify soft classifications for a variety of three-dimensional digital models.

Figure 3:
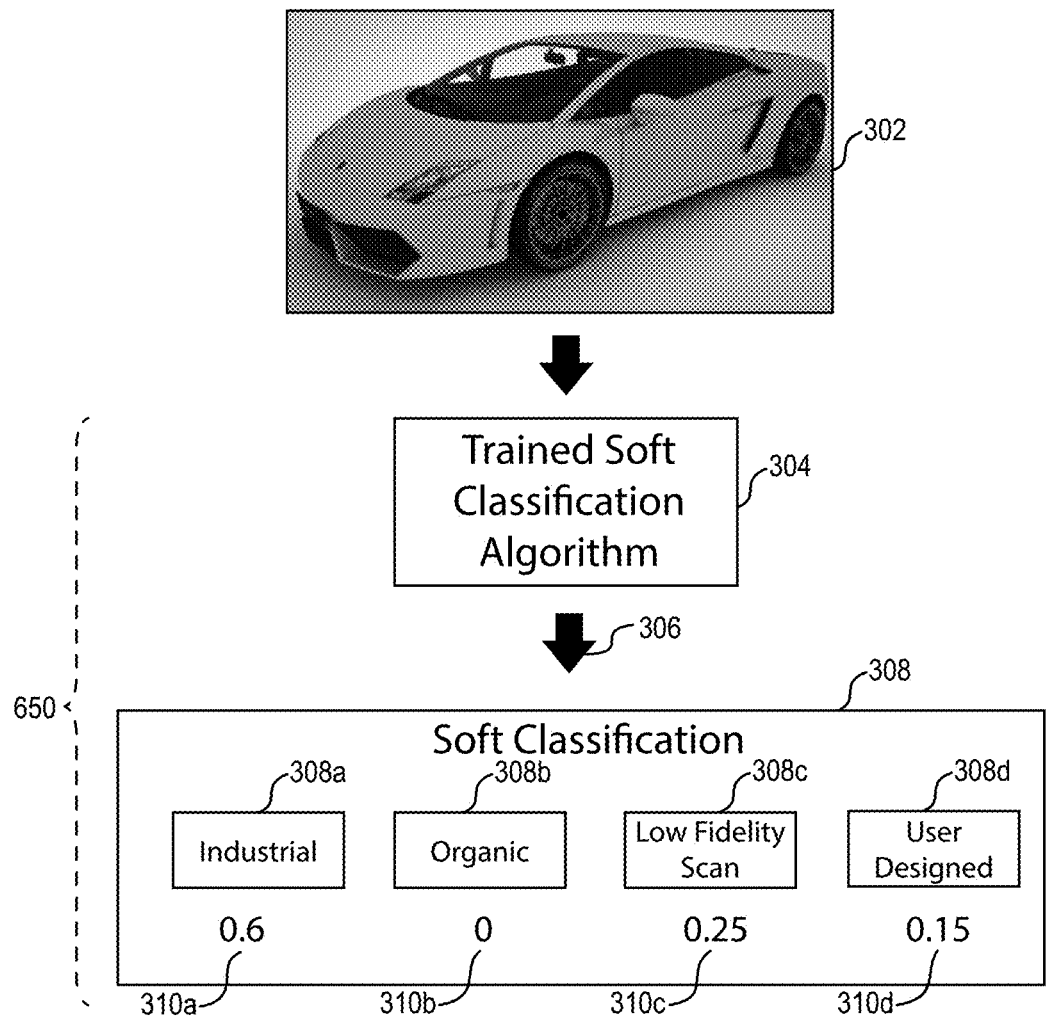
FIG. 3 illustrates a representation of utilizing a soft classification algorithm to generate a soft classification for a three-dimensional digital model in accordance with one or more embodiments.

Indeed, as discussed previously, upon training a soft classification algorithm, the digital segmentation system can utilize the soft classification algorithm to generate soft classifications corresponding to three-dimensional digital models. For example, FIG. 3 illustrates generating a soft classification utilizing a soft classification algorithm in accordance with one or more embodiments. Specifically, FIG. 3 illustrates a three-dimensional digital model 302. The digital segmentation system provides the three-dimensional digital model 302 to the trained soft classification algorithm 304. The digital segmentation system then performs the act 306 of utilizing the trained soft classification algorithm 304 to generate a soft classification 308.

Indeed, as discussed in relation to FIG. 2, the trained soft classification algorithm 304 was previously trained based on a plurality of training digital models and training soft classification categories to generate soft classifications for three-dimensional digital models. Accordingly, the trained soft classification algorithm 304 generates the soft classification 308 corresponding to the three-dimensional digital model 302 based on training digital models and training soft classification categories.

As discussed previously, the soft classification 308 can comprise a determination that a three-dimensional digital model corresponds to one or more soft classification categories. In relation to the embodiment of FIG. 3, the soft classification 308 comprises a plurality of probabilities 310a-310d corresponding to a plurality of soft classification categories 308a-308d. Specifically, the soft classification 308 indicates that the three-dimensional digital model 302 has a 60% probability of belonging to the industrial soft classification category 308a, a 0% chance of belonging to the organic soft classification category 308b, a 25% chance of belonging to the low fidelity scan soft classification category 308c, and a 15% change of belonging to the user designed soft classification category 308d.

As mentioned previously, the digital segmentation system can utilize a soft classification (e.g., the soft classification 308) to tune one or more segmentation algorithms and identify a segment of a three-dimensional digital model. For instance, in one or more embodiments, the digital segmentation system can select one or more segmentation algorithms from a plurality of software segmentation algorithms. Indeed, as discussed above, different segmentation algorithms may be more accurate and/or efficient in identifying segments from a three-dimensional digital model. The digital segmentation system can utilize the soft classification probabilities and a correspondence between segmentation algorithms and soft classifications to select one or more segmentation algorithms.

Figure 4:
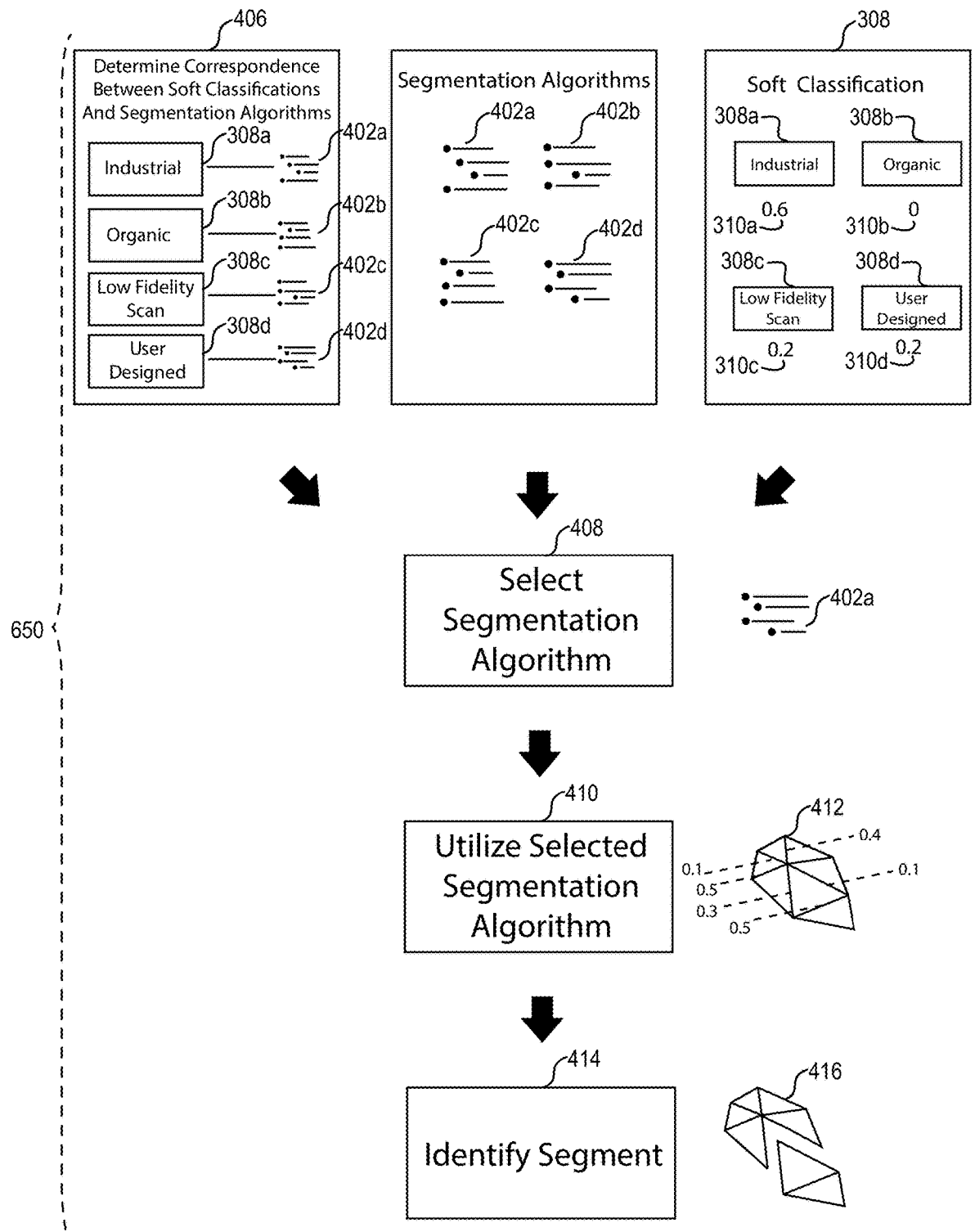
FIG. 4 illustrates a representation of utilizing a soft classification to select a segmentation algorithm and identify a segment of a three-dimensional digital model in accordance with one or more embodiments.

For example, FIG. 4 illustrates selecting a segmentation algorithm and identifying a segment of a three-dimensional digital model in accordance with one or more embodiments. In particular, FIG. 4 illustrates a plurality of segmentation algorithms 402a-402d. Each of the segmentation algorithms 402a-402d utilize a different approach to identifying segments of a three-dimensional digital model.

Indeed, as mentioned above, a plurality of segmentation algorithms exist for identifying segments of a three-dimensional digital model, each with different input parameters and approaches. The digital segmentation system can utilize one or more of these segmentation algorithms to efficiently and accurately identify a segment from a digital model. For example, the digital segmentation system can utilize the approach described in Learning 3D Mesh Segmentation and Labeling, Evangelos Kalogerakis, Aaron Hertzmann, Karan Singh, ACM Transactions on Graphics 29(3) (July 2010), incorporated by reference herein, as one of the segmentation algorithms 402a-402d. Similarly, for the segmentation algorithms 402a-402d, the digital segmentation system can utilize the approaches described in Mehmet Ersin Yumer, Won Chun, Ameesh Makadia, *Co-Segmentation of Textured 3D Shapes with Sparse Annotations*, 2014 IEEE Conference on Computer Vision and Pattern Recognition (2014); the approach described in Xiaobai Chen, Aleksey Golovinskiy, Thomas Funkhouser, *A Benchmark for 3D Mesh Segmentation*, ACM Transactions on Graphics 28(3) (August 2009); and/or the approach described in Aleksey Golovinskiy and Thomas Funkhouser, *Randomized Cuts for 3D Mesh Analysis*, ACM Transactions on Graphics 27(5) (December 2008), each of which are incorporated by reference herein. Each of these (and other) algorithms have their own unique input parameters, solutions, strengths, and weaknesses. The digital segmentation system can determine a correspondence between these algorithms and one or more soft classifications and utilize the correspondence to select segmentation algorithms for a particular three-dimensional digital model.

For example, as illustrated in FIG. 4, the digital segmentation system performs an act 406 of determining a correspondence between soft classifications and segmentation algorithms. The digital segmentation system can determine the correspondence between the soft classifications and the segmentation algorithms in a variety of ways. For example, in one or more embodiments, the digital segmentation system receives user input of a correspondence. To illustrate, a user can indicate that a particular segmentation algorithm (or combination of segmentation algorithms) works accurately and/or efficiently in relation to one or more soft classification categories.

In other embodiments, the digital segmentation system determines a correspondence between soft classifications and segmentation algorithms based on training digital models. For example, in one or more embodiments, the digital segmentation system utilizes training digital models, training software classifications, and known ground truth results (i.e., ground truth segments or ground truth edge segmentation scores) to determine what segmentation algorithms perform most accurately and/or efficiently in relation to particular soft classification categories.

To illustrate, the digital segmentation system applies different segmentation algorithms to a training digital model of a known training soft classification category. The digital segmentation system compares the results of the segmentation algorithm (e.g., a segment identified by the training algorithm) with ground truth results. Similarly, the digital segmentation system compares the time and processing power required to utilize the segmentation algorithm. Based on the comparison, the digital segmentation system can determine segmentation algorithms that most accurately and/or efficiently identify segments in relation to the known soft classification. The digital segmentation system can repeat this process for a variety of different training digital models and training soft classification categories. In this manner, the digital segmentation system can determine a correspondence between soft classifications and segmentation algorithms.

For example, in relation to FIG. 4, the digital segmentation system determines a correspondence between the segmentation algorithms 402a-402d and the soft classification categories 308a-308d. In particular, the digital segmentation system determines that the segmentation algorithm 402a performs most accurately in relation to the soft classification category 308a, the segmentation algorithm 402b performs most accurately in relation to the soft classification category 308b, the segmentation algorithm 402c performs most accurately in relation to the soft classification category 308c, and the segmentation algorithm 402d performs most accurately in relation to the soft classification category 308d.

Although the embodiment of FIG. 4 illustrates a single segmentation algorithm that corresponds to a single soft classification category, the digital segmentation system can identify a correspondence between multiple segmentation algorithms and multiple soft classification categories. For example, the digital segmentation system can determine that a combination of algorithms (e.g., 50% of a first segmentation algorithm and 50% of a second segmentation algorithm) produce the best results in relation to a particular soft classification category. Similarly, the digital segmentation system can determine that a segmentation algorithm operates effectively in relation to multiple soft classification categories (e.g., a first segmentation algorithm operates most accurately in relation to three-dimensional digital models that are 50% organic and 50% low fidelity scan). Moreover, although FIG. 4 illustrates a particular number of soft classification categories, as discussed above, the digital segmentation system can utilize greater or fewer soft classification categories than those shown.

As shown in FIG. 4, the digital segmentation system also performs the act 408 of selecting a segmentation algorithm. In particular, the act 408 includes selecting a segmentation algorithm from the plurality of segmentation algorithms 402a-402d based on a soft classification and the determined correspondence between the plurality of segmentation algorithms 402a-402d and the soft classification categories 308a-308d.

For example, in relation to the embodiment of FIG. 4, the digital segmentation system utilizes the soft classification 308 (from FIG. 3) comprising the probabilities 310a-310d corresponding to the soft classification categories 308a-308d. The digital segmentation system can perform the act 408 by comparing the probabilities 310a-310d. For example, the digital segmentation system can compare the probabilities 310a-310d and determine that the soft classification category 308a has the highest probability (i.e., 0.6 versus 0.25, 0.15, and 0). In response to the determination that the classification category 308a has the highest probability, the digital segmentation system can select a segmentation algorithm that corresponds to the soft classification category 308a. Specifically, based on the determination that the segmentation algorithm 402a corresponds to the soft classification category 308a, the digital segmentation system selects the segmentation algorithm 402a.

Although the foregoing example illustrates selecting a single segmentation algorithm, the digital segmentation system can select multiple algorithms. For instance, the digital segmentation system can select the segmentation algorithms corresponding to the soft classification categories with the three highest probabilities. To illustrate, in relation to FIG. 4, the digital segmentation system can choose the segmentation algorithm 402a, 402c, and 402d by comparing the probabilities 310a-310d and determining that probabilities 310a, 310c, and 310d of soft classification categories 308a, 308c, and 308d corresponding to the segmentation algorithms 402a, 402c, and 402d are the three highest (i.e., 0.6, 0.25, and 0.15).

Similarly, the digital segmentation system can select multiple segmentation algorithms based on a correspondence between a particular soft classification and multiple segmentation algorithms. For example, the digital segmentation system can determine that a first segmentation algorithm and a second segmentation algorithm operate most accurately for industrial soft classification categories. The digital segmentation system can select the first segmentation algorithm and the second segmentation algorithm based on a high probability indicating a three-dimensional digital model corresponds to an industrial soft classification category (e.g., select the first segmentation algorithm and the segmentation algorithm where a probability of an industrial soft classification category is 0.6).

Similarly, the digital segmentation system can select a segmentation algorithm based on multiple probabilities. To illustrate, the digital segmentation system can determine that a segmentation algorithm works accurately in relation to three-dimensional digital models that have a 40-60% probability of belonging to an organic soft classification category and a 40-60% probability of belonging to an industrial soft classification category (or some other probability or range of probabilities). In response to a determination that a three-dimensional digital model corresponds to a soft classification matching these probabilities, the digital segmentation system can select the segmentation algorithm.

To reduce burdens on computer processing, the digital segmentation system can also limit the number of segmentation algorithms selected based on one or more thresholds. For example, the digital segmentation system can select segmentation algorithms corresponding to soft classification categories only when a corresponding probability exceeds a probability threshold (e.g., exceeds 20%). To illustrate, in relation to the embodiment of FIG. 4, by applying a 20% probability threshold, the digital segmentation system can select the segmentation algorithms 402a and 402c. Specifically, the segmentation algorithm 402a corresponds to the soft classification category 308a with a probability 310a greater than 20% and the segmentation algorithm 402c corresponds to the soft classification category 308c having a probability 310c greater than 20%. In response to determining that probability 310a and the probability 310c are greater than the threshold, the digital segmentation system can select the segmentation algorithms 402a and 402c.

In addition, in one or more embodiments, the digital segmentation system will only select a single segmentation algorithm (and exclude other segmentation algorithms) based on a probability threshold. For example, the digital segmentation system can determine that because a probability exceeds a probability threshold (e.g., above 95%) only a single segmentation algorithm corresponding to the probability is needed to identify a segment. By limiting the number of segmentation algorithms, the digital segmentation system can limit the amount of processing power required to identify a segment of a three-dimensional digital model.

To illustrate, consider a situation where the probability 310a corresponding to the soft classification category 308a is 0.97 (rather than 0.6). In such circumstances, the digital segmentation system can compare the probability 310a (i.e., 0.97) to the probability threshold (i.e., 0.95) and determine that the probability 310a exceeds the probability threshold. In response, the digital segmentation system can the segmentation algorithm 402a and exclude the other segmentation algorithms in determining a segment corresponding to a three-dimensional model (e.g., the three-dimensional digital model 302).

As illustrated in FIG. 4, the digital segmentation system also performs the act 410 of utilizing a selected segmentation algorithm. For example, the act 410 can include applying a selected segmentation algorithm to a three-dimensional digital model. Indeed, as shown in FIG. 4, the digital segmentation system can apply the selected segmentation algorithm 402a to the three-dimensional digital model 302.

As discussed above, in one or more embodiments, the digital segmentation system utilizes segmentation algorithms that generate segmentation parameters, such as edge segmentation scores. For example, segmentation algorithms can generate edge segmentation scores that reflect a cost (or lack of cost) of cutting edges in identifying a segment. Accordingly, as illustrated in FIG. 4, the segmentation algorithm 402a generates edge segmentation scores in relation to a plurality of edges of the three-dimensional digital model 302. In particular, FIG. 4 illustrates a representation of a plurality of edges 412 of the three-dimensional digital model 302. As shown, the digital segmentation system utilizes the selected segmentation algorithm 402a to generate edge segmentation scores corresponding to edge of the plurality of edges 412.

Furthermore, as illustrated, the digital segmentation system also performs the act 414 of identifying a segment. In particular, the act 414 can include identifying a segment of the three-dimensional digital model 302 based on the selected segmentation algorithm 402a. Specifically, the act 414 can include identifying a segment based on the segmentation parameters (e.g., the edge segmentation scores) generated based on the selected segmentation algorithm 402a.

In one or more embodiments, the digital segmentation system utilizes only the selected segmentation algorithm 402a to identify a segment from the three-dimensional digital model. In other embodiments, the digital segmentation system utilizes an additional algorithm to identify a segment based on the segmentation parameters. For example, the digital segmentation system can utilize a graph cut algorithm that utilizes edge segmentation scores to identify segments of a three-dimensional digital model. For example, the digital segmentation system can utilize the approach described in Yuri Boykov, Olga Veksler, Ramin Zabih, *Fast Approximate Energy Minimization via Graph Cuts*, IEEE Transactions on Pattern Analysis and Machine Intelligence, Vol. 23, No. 11 (November 2011), which is incorporated herein by reference.

Thus, as illustrated in FIG. 4, the digital segmentation system identifies a segment 416. Specifically, the digital segmentation system identifies the segment 416 utilizing a graph cut algorithm based on the segmentation parameters generated from the selected segmentation algorithm 402a.

Although FIG. 4 illustrates utilizing a single segmentation algorithm to generate segmentation parameters and identify a segment of a three-dimensional digital model, as mentioned previously, the digital segmentation system can also select a plurality of segmentation algorithms and combine segmentation parameters from the plurality of segmentation algorithms to identify a segment of a three-dimensional digital model. For example, FIG. 5 illustrates selecting a plurality of segmentation algorithms and generating mixed segmentation parameters to identify a segment of a three-dimensional digital model.

Figure 5:
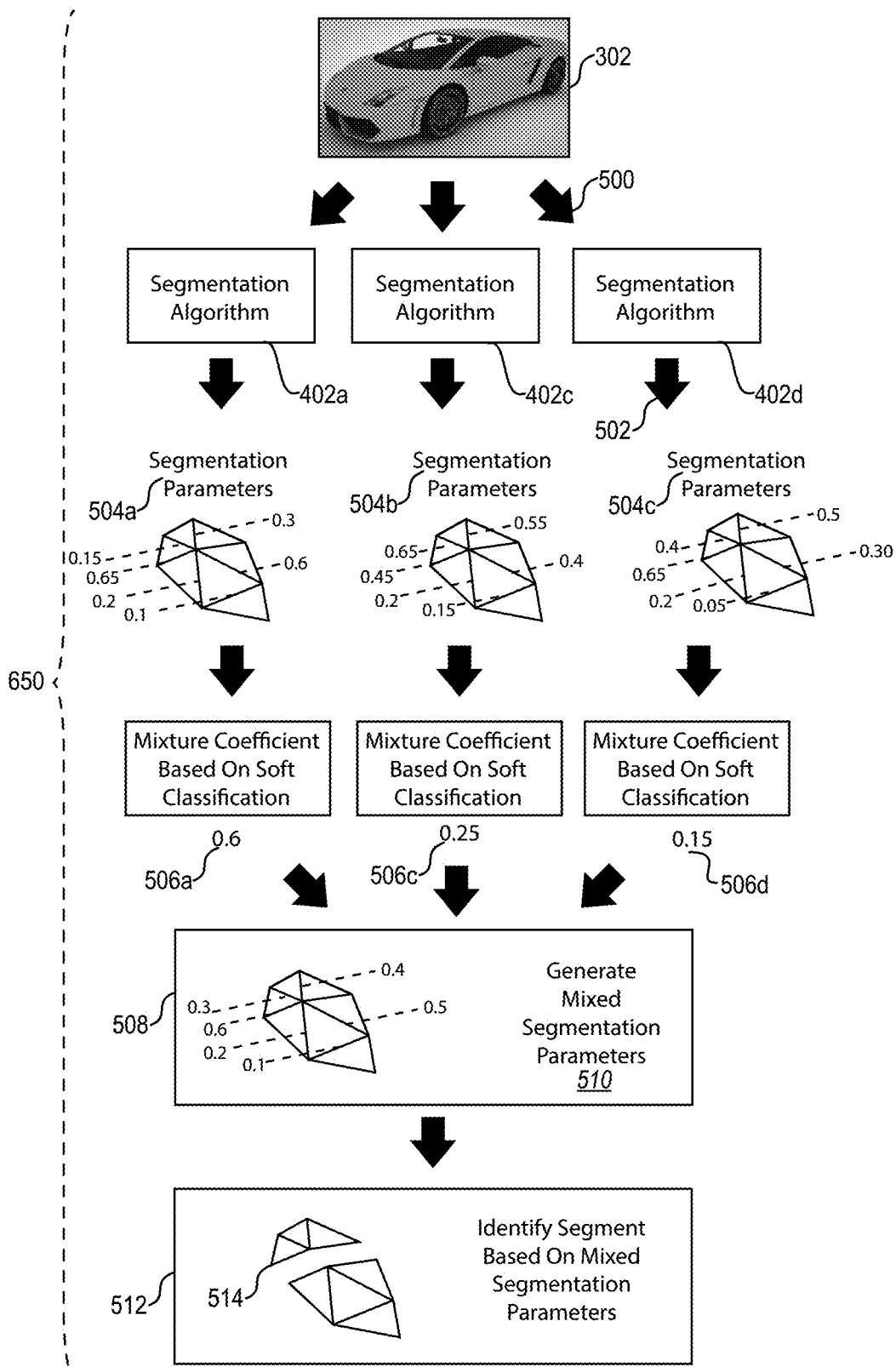
FIG. 5 illustrates a representation of generating a mixed segmentation parameter utilizing a soft classification and identifying a segment of a three-dimensional digital model based on the mixed segmentation parameter in accordance with one or more embodiments.

In particular, as illustrated in FIG. 5, the digital segmentation system performs the act 500 of selecting a plurality of segmentation algorithms 402a, 402c, and 402d. As described in relation to FIG. 4, the digital segmentation system can select the plurality of segmentation algorithms 402a, 402c, and 402d based on a soft classification and based on a correspondence between the plurality of segmentation algorithms and soft classification categories. Thus, in relation to FIG. 5, the digital segmentation system performs the act 500 by comparing the probabilities 310a-310d of the soft classification categories 308a-308d. Specifically, for example, the digital segmentation system identifies the soft classification categories 308a, 308c, 308d with probabilities that exceed a probability threshold (e.g., 10%).

The digital segmentation system then selects the segmentation algorithms by determining a correspondence between the identified soft classification categories 308a, 308c, 308d and the segmentation algorithms 402a, 402c, and 402d. Indeed, as described in relation to the act 406, the digital segmentation system determines that the soft classification category 308a corresponds to the segmentation algorithm 402a, the soft classification category 308c corresponds to the segmentation algorithm 402c, and the soft classification category 308d corresponds to the segmentation algorithm 402d.

As further shown in FIG. 5, the digital segmentation system also performs act 502 of utilizing the segmentation algorithms to generate segmentation parameters. In particular, as shown in FIG. 5, the digital segmentation system utilizes the segmentation algorithms 402a, 402c, and 402d to generate the corresponding segmentation parameters 504a, 504c, and 504d. In particular, the segmentation parameters 504a, 504c, and 504d comprise edge segmentation scores for edges of the three-dimensional digital model 302. Although FIG. 5 illustrates edge segmentation scores, the digital segmentation system can generate any variety of segmentation parameters for identifying a segment of a three-dimensional digital model.

As shown, the segmentation parameters 504a are different than the segmentation parameters 504c, which are different from the segmentation parameters 504d. As mentioned, this can result from the digital segmentation system generating the segmentation parameters 504a, 504c, and 504d utilizing different segmentation algorithms. As mentioned previously, however, the digital segmentation system can combine the segmentation parameters 504a, 504c, and 504d based on a soft classification to generate a mixed segmentation parameter.

For example, as shown in FIG. 5, the digital segmentation system generates mixture coefficients 506a, 506c, and 506d for the segmentation parameters 504a, 504c, and 504d. More specifically, the digital segmentation system generates the mixture coefficients 506a, 506c, and 506d for each of the segmentation parameters 504a, 504c, and 504d based on a soft classification.

To illustrate, and as mentioned above, the digital segmentation system determines probabilities 310a-310d corresponding to the soft classification categories 308a-308d. The digital segmentation system also determines a correspondence between the soft classification categories 308a-308d and the segmentation algorithms 402a-402d. The digital segmentation system can then determine the mixture coefficients 506a, 506c, and 506d utilizing the probabilities 310a, 310c, and 310d corresponding to the respective segmentation algorithms.

Thus, as illustrated in FIG. 5, the digital segmentation system generates a mixture coefficient 506a corresponding to the segmentation parameters 504a from the segmentation algorithm 402a based on the soft classification category 308a and corresponding probability 310a (i.e., 0.6). Similarly, the digital segmentation system generates the mixture coefficient 506c based on the probability 310c (i.e., 0.25). Moreover, the digital segmentation system generates the mixture coefficient 506d based on the probability 310d (i.e., 0.15).

Although the foregoing example utilizes a mixture coefficient that directly corresponds to a probability from a soft classification, the digital segmentation system can generate a mixture coefficient that is based on, but not identical to, the soft classification. For example, the digital segmentation system can generate mixture coefficients that are a multiple (e.g., double or half) of soft classification probabilities or some other function of soft classification probabilities.

As shown in FIG. 5, the digital segmentation system also performs the act 508 of generating mixed segmentation parameters. In particular, the act 508 includes generating mixed segmentation parameters 510 based on the mixture coefficients 506a, 506c, and 506d, and the segmentation parameters 504a, 504c, and 504d. Specifically, in relation to FIG. 5, the digital segmentation system multiplies the segmentation parameters 504a by the mixture coefficient 506a and adds the result to the product of the segmentation parameters 504c and the mixture coefficient 506c and the product of the segmentation parameters 504d and the mixture coefficient 506d. In other words, the digital segmentation system generates mixed segmentation parameters according to the following:

$$P_m = P_1 \cdot w_1 + P_2 \cdot w_2 + P_3 \cdot w_3 \ldots + P_n \cdot w_n$$

where $P_m$ is a mixed segmentation parameter, $P_n$ is a segmentation parameter corresponding to a particular segmentation algorithm, and $w_n$ is a mixture coefficient corresponding to a particular segmentation algorithm.

Thus, the mixed segmentation parameters 510 reflect the segmentation parameters 504a, 504, and 504d generated from the segmentation algorithms 402a, 402c, and 402d mixed according to the soft classification of the three-dimensional digital model 302. In this manner, the digital segmentation system generates mixed segmentation parameters that are specific to the particular soft classification of the three-dimensional digital model 302 and uniquely suited to accurately and efficiently identify a segment of the three-dimensional digital model 302 having unique features and characteristics.

As shown in FIG. 5, upon generating the mixed segmentation parameters, the digital segmentation system also performs the act 512 of identifying a segment based on the mixed segmentation parameters. In particular, the digital segmentation system identifies the segment 514 by cutting the three-dimensional digital model based on the mixed segmentation parameters 510. As discussed above, in one or more embodiments, the digital segmentation system utilizes an edge cutting algorithm in conjunction with the mixed segmentation parameters to identify the segment 514.

As mentioned previously, in addition to identifying a segment utilizing mixed segmentation parameters, the digital segmentation system can also determine input parameters based on a soft classification. Indeed, the digital segmentation system can determine input parameters for one or more segmentation algorithms based on a soft classification of a three-dimensional digital model. For example, FIG. 6 illustrates determining input parameters for a segmentation algorithm and utilizing the input parameters to identify a segment of a three-dimensional digital model in accordance with one or more embodiments.

Figure 6:
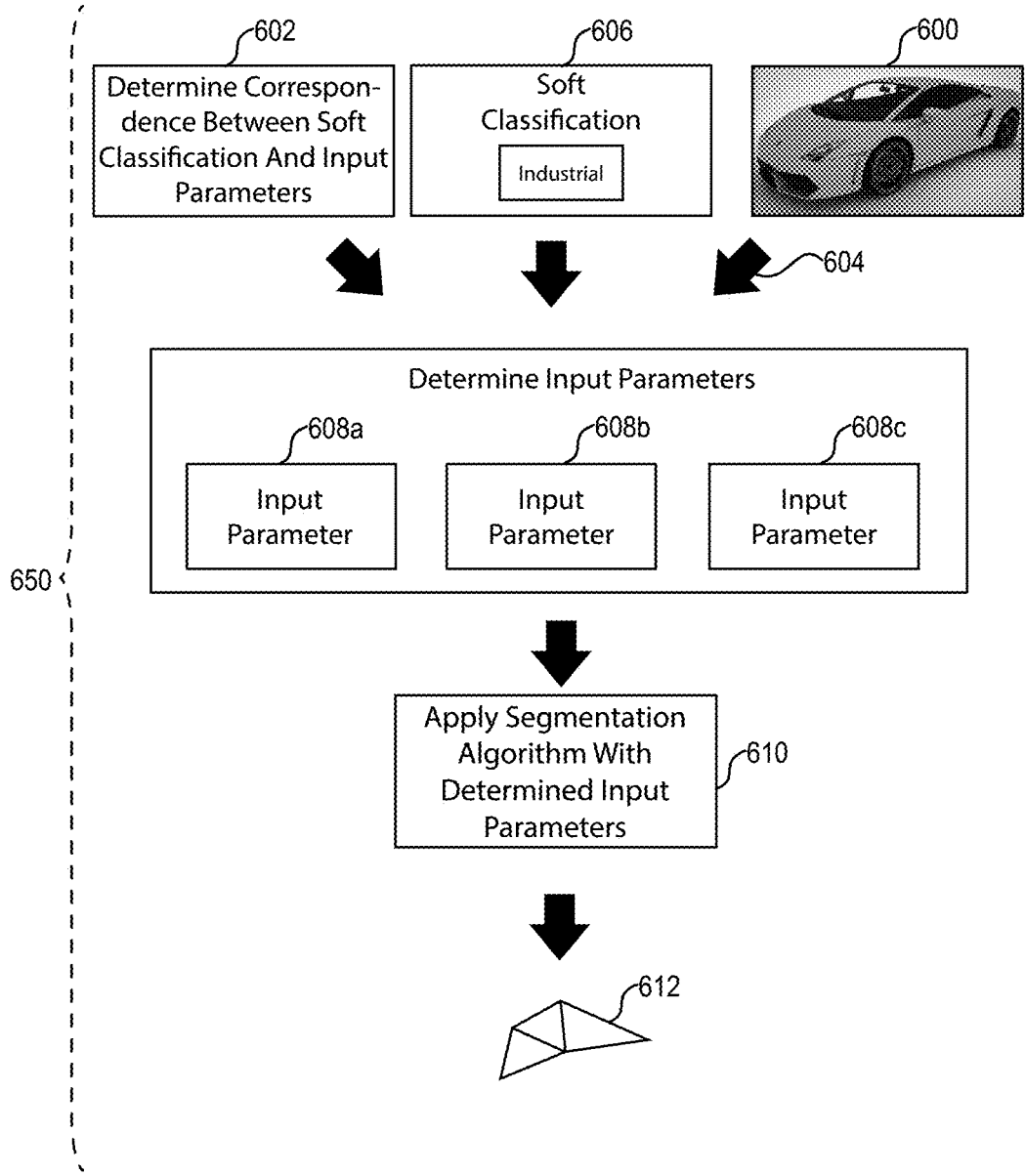
FIG. 6 illustrates a representation of determining input parameters based on a soft classification and utilizing the input parameters to identify a segment of a three-dimensional digital model in accordance with one or more embodiments.

Specifically, as shown in FIG. 6, the digital segmentation system performs the act 602 of determining a correspondence between soft classifications and input parameters. For example, the digital segmentation system can determine that particular input parameters of a segmentation algorithm produce the most accurate and/or efficient results in relation to three-dimensional digital models that belong to a particular soft classification category.

The digital segmentation system can determine a correspondence between soft classifications and input parameters in a variety of ways. For example, the digital segmentation system can receive user input of a correspondence between soft classifications and input parameters. To illustrate, the digital segmentation system can receive user input indicating that industrial soft classification categories operate most accurately and/or efficiently with a particular input parameter.

In addition to user input, the digital segmentation system can also determine a correspondence between soft classifications and input parameters based on training digital models. For example, the digital segmentation system can provide a training digital model corresponding to a known training soft classification category and known segments to a segmentation algorithm. The digital segmentation system can modify input parameters of the segmentation algorithm and utilize the segmentation algorithm to predict segments of the training digital model. The digital segmentation system can then compare the predicted segments with the known segments to determine what input parameters most accurately identified the known segments. The digital segmentation system can thus identify input parameters that most accurately identify segments in relation to the known training soft classification category. By repeatedly utilizing different training digital models with known segments and training soft classification parameters, the digital segmentation system can identify input parameters that most accurately identify segments across different soft classification categories. In this manner, the digital segmentation system can determine a correspondence between soft classifications and input parameters.

As shown in FIG. 6, the digital segmentation system also performs an act 604 of utilizing a soft classification to determine input parameters. In particular, the digital segmentation system can identify a soft classification 606 corresponding to a three-dimensional digital model 600 (e.g., as described in relation to FIG. 3). For example, as shown in FIG. 6, the digital segmentation system can determine that the three-dimensional digital model 600 corresponds to an industrial soft classification category. The digital segmentation system can then determine a plurality of input parameters based on the soft classification 606 and the correspondence between the soft classification and input parameters.

To illustrate, in performing the act 602, the digital segmentation system can determine that a segmentation algorithm is more accurate in relation to an industrial soft classification category when utilizing the input parameter 608a, the input parameter 608b, and the input parameter 608c. In response to determining that the three-dimensional digital model corresponds to the industrial soft classification category, the digital segmentation system can determine the input parameters 608a-608c.

As shown in FIG. 6, upon determining the input parameters 608a-608c, the digital segmentation system can perform the act 610 of applying the segmentation algorithm with the determined input parameters. In particular, the digital segmentation system can apply the segmentation algorithm with the determined input parameters to generate a segment 612 of the three-dimensional digital model 600.

While FIGS. 4-6 illustrate different embodiments for identifying a segment utilizing a soft classification, it is appreciated, based on this disclosure, that the digital segmentation system can combine the approaches described in FIGS. 4-6 in one or more embodiments. For example, the digital segmentation system can utilize a soft classification to select one or more segmentation algorithms from a plurality of segmentation algorithms. Moreover, the digital segmentation system can utilize the soft classification to determine input parameters corresponding to the segmentation algorithms. In addition, the digital segmentation system can utilize the input parameters and corresponding segmentation algorithms to generate segmentation parameters. Furthermore, the digital segmentation system can generate mixed segmentation parameters based on the soft classification to identify a segment of a three-dimensional digital model.

Furthermore, in one or more embodiments the digital segmentation system performs a step 650 for identifying a segment of a three-dimensional digital model corresponding to a selection utilizing a soft classification of a three-dimensional digital model. FIGS. 3-6 illustrate various acts for performing the step 650.

Indeed, as illustrated in FIG. 3, the step 650 includes the act 306 of utilizing a soft classification algorithm to generate a soft classification. Moreover, as shown in FIG. 4, in at least one embodiment, upon generating the soft classification, the step 650 includes the act 406 of determining a correspondence between soft classifications and segmentation algorithms and the act 408 of selecting a segmentation. Moreover, in the at least one embodiment, the step 650 includes the act 410 of utilizing the selected segmentation algorithm and the act 414 of identifying a segment.

Furthermore, FIGS. 3 and 5 also illustrate a variety of acts for performing the step 650 in accordance with one or more embodiments. For example, as shown in FIG. 5, in the one or more embodiments, upon performing the act 306 of generating the soft classification, the step 650 includes the act 500 of selecting a plurality of segmentation algorithms. Moreover, in the one or more embodiments, the step 650 includes the act 502 of utilizing the segmentation algorithms to generate segmentation parameters. In addition, in the one or more embodiments, the step 650 includes the act 508 of generating mixed segmentation parameters. Moreover, in the one or more embodiments, the step 650 includes the act 512 of identifying a segment based on the mixed segmentation parameters.

In addition, FIGS. 3 and 6 also illustrate acts for performing the step 650. For example, in at least one additional embodiment, upon generating the soft classification (e.g., at the act 306), the step 650 includes the act 602 of determining a correspondence between soft classifications and input parameters. Moreover, in the at least one additional embodiment, the step 650 includes the act 604 of utilizing a soft classification to determine input parameters. Further, in the at least one additional embodiment, the step 650 includes the act 610 of applying the segmentation algorithm with the determined input parameters.

Figure 7A:
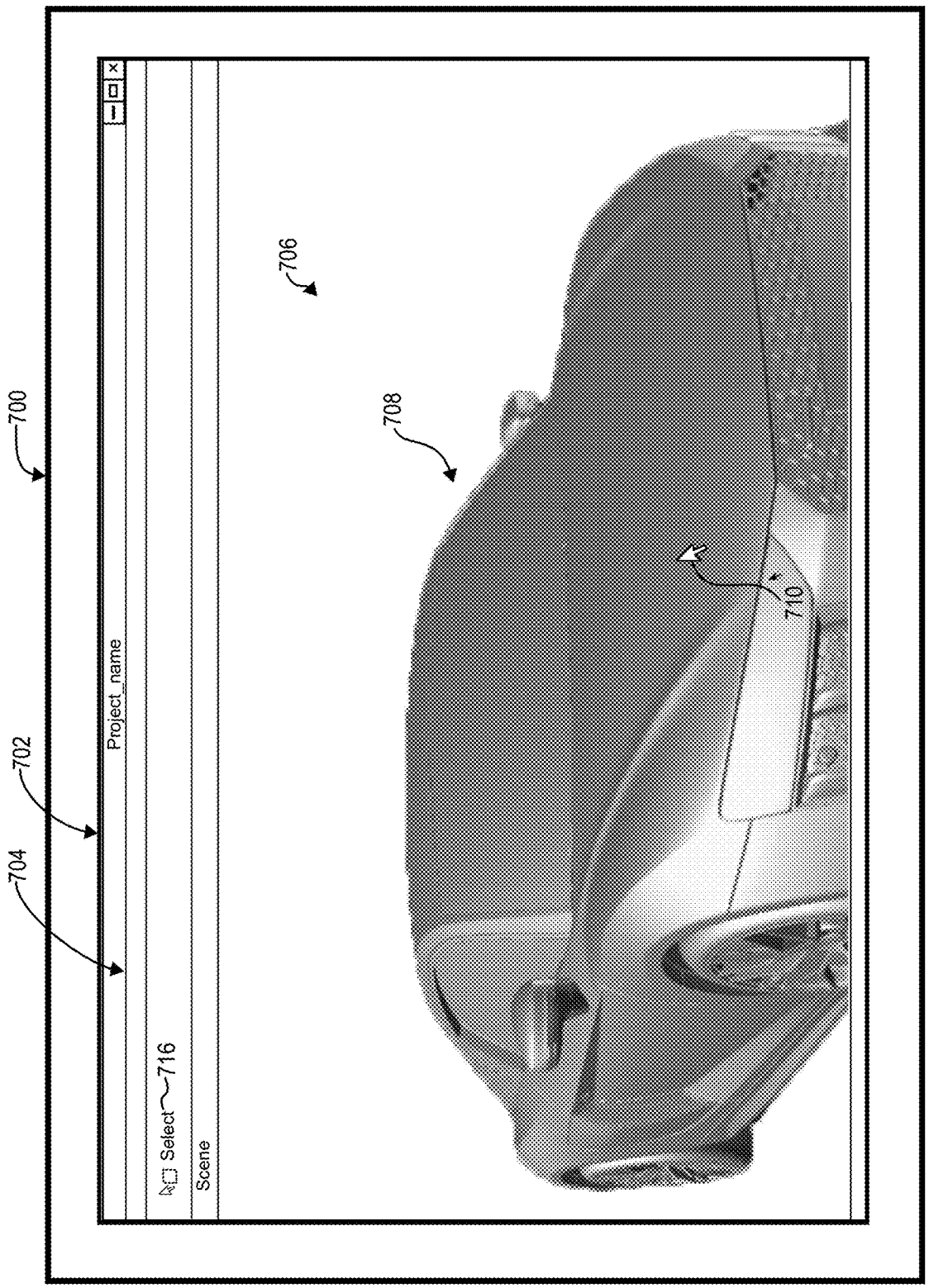
FIGS. 7A-7B illustrate a computing device with a user interface for selecting a segment of a three-dimensional digital model based on a soft classification in accordance with one or more embodiments.
Figure 7B:
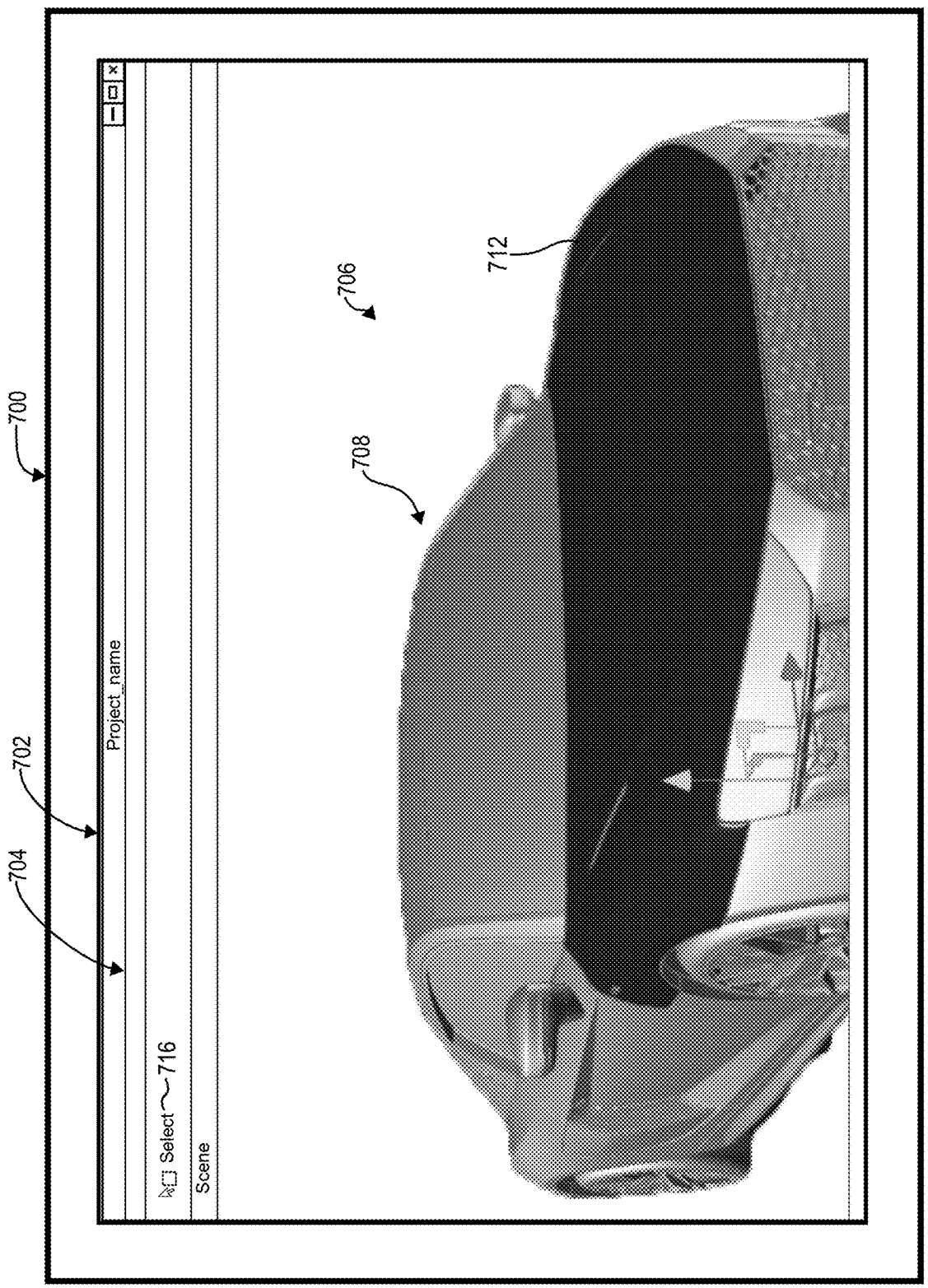

Turning now to FIGS. 7A-7B additional detail will be provided regarding a user interface for selecting a segment of a three-dimensional digital model in accordance with one or more embodiments. In particular, FIG. 7A illustrates a computing device 700 with a display screen 702 displaying a user interface 704. As shown, the user interface 704 includes a variety of components, including a digital model interaction element 706.

As illustrated in FIG. 7A, the digital model interaction element 706 includes a representation of a three-dimensional digital model 708. Moreover, the digital model interaction element 706 allows a user to interact with the three-dimensional digital model 708. For example, a user can provide a selection in relation to a portion 710 of the three-dimensional digital model 708 (e.g., a click or press event on an element such as a vertex or edge of the three-dimensional digital model). In response, the digital segmentation system can identify a segment of the three-dimensional digital model 708 and allow the user to modify the identified segment.

In one or more embodiments, the digital segmentation system can activate certain segmentation features in response to selection of a particular tool. For example, FIG. 7A illustrates a selection tool element 716. In relation to the embodiment of FIG. 7A, the digital segmentation system activates segmentation features in response to user interaction with the selection tool element 716. For example, in response to user interaction with the selection tool element 716, the digital segmentation system can determine a soft classification corresponding to the three-dimensional digital model 708. Specifically, as described previously, the digital segmentation system can determine a soft classification corresponding to the three-dimensional digital model 708 and utilize the soft classification to select one or more segmentation algorithms based on the soft classification. Moreover, the digital segmentation system can utilize the selected one or more segmentation algorithms to identify a segment of the three-dimensional digital model 708.

For example, as shown in FIG. 7B, upon receiving user interaction with the portion 710, the digital segmentation system identifies a segment 712 of the three-dimensional digital model 708. In particular, the digital segmentation system identifies the segment 712 corresponding to the portion 710 of the three-dimensional digital model 708 selected by the user.

Moreover, the user interface 704 can further include modification elements to revise the three-dimensional digital model 708. In particular, the user interface 704 can include modification elements that comprise selectable options for modifying the segment 712. For example, upon user interaction with the modification elements, the digital segmentation system can modify appearance of the segment 712 to match a material corresponding to the selected modification element. To illustrate, the digital segmentation system can modify appearance of the segment 712 such that it appears to be made out of different materials.

The user interface 704 can include a variety of modification elements to modify the segment 712. For example, the user interface 704 can include elements for moving or rotating the segment 712, changing the shape of the segment 712 (e.g., to stretch, shrink, or modify vertices or edges), or otherwise modify the segment 712. In this manner, the digital segmentation system can allow users to easily, quickly, and efficiently select and modify segments of a three-dimensional digital model.

Figure 8:
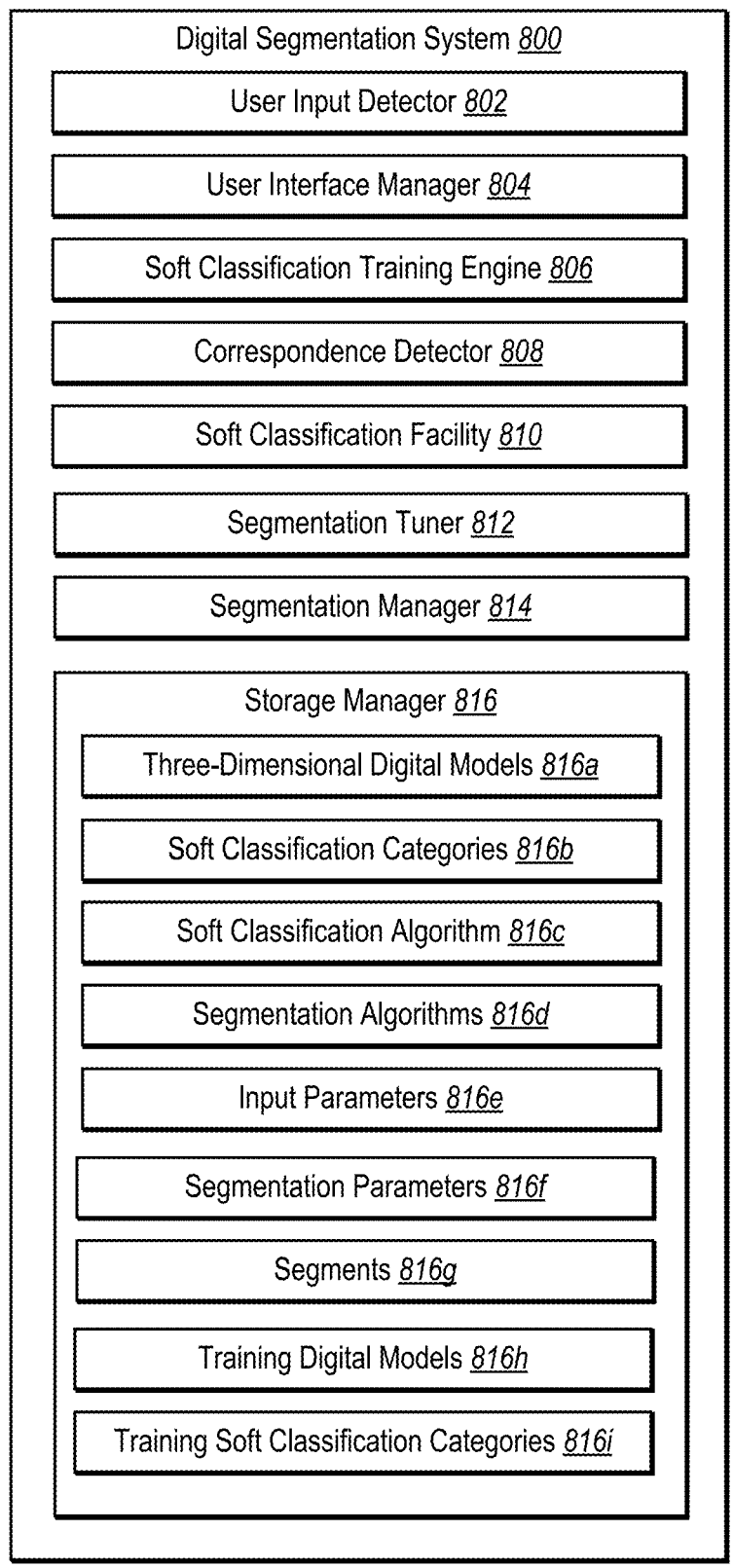
FIG. 8 illustrates a schematic diagram illustrating a digital segmentation system in accordance with one or more embodiments.

Turning now to FIG. 8, additional detail is provided regarding components and capabilities of one embodiment of the digital segmentation system. In particular, FIG. 8 illustrates an embodiment of an exemplary digital segmentation system 800 (e.g., the digital segmentation system referenced above). As shown, the digital segmentation system 800 may include, but is not limited to a user input detector 802, a user interface manager 804, a soft classification training engine 806, a correspondence detector 808, a soft classification facility 810, a segmentation tuner 812, a segmentation manager 814, and a storage manager 816 (comprising three-dimensional digital models 816a, soft classification categories 816b, soft classification algorithm 816c, segmentation algorithms 816d, input parameters 816e, segmentation parameters 816f, segments 816g, training digital models 816h, and training soft classification categories 816i).

As just mentioned, and as illustrated in FIG. 8, the digital segmentation system 800 may include the user input detector 802. The user input detector 802 can detect, identify, monitor, receive, process, capture, and/or record various types of user input. For example, the user input detector 802 can detect one or more user interactions with respect to a user interface. In particular, the user input detector 802 can detect user selection of a portion of a three-dimensional digital model.

The user input detector 802 can operate in conjunction with any number of user input devices or computing devices (in isolation or in combination), including personal computers, laptops, smartphones, smart watches, tablets, touchscreen devices, televisions, personal digital assistants, mouse devices, keyboards, track pads, or stylus devices. The user input detector 802 detects and identifies various types of user interactions with user input devices, such as press events, drag events, scroll events, release events, and so forth. For example, in the event a client device corresponding to the digital segmentation system 800 includes a touch screen, the user input detector 802 detects one or more touch gestures (e.g., swipe gestures, tap gestures, pinch gestures, or reverse pinch gestures) from a user that forms a user interaction.

As just mentioned, and as illustrated in FIG. 8, the digital segmentation system 800 also includes the user interface manager 804. The user interface manager 804 provides, manages, and/or controls a graphical user interface (or simply "user interface") for use with the digital segmentation system 800. In particular, the user interface manager 804 can facilitate presentation of information by way of an external component of a client device (e.g., the computing device 700). For example, the user interface manager 804 can display a user interface by way of a display screen associated with a client device. The user interface may be composed of a plurality of graphical components, objects, and/or elements that allow a user to perform a function. The user interface manager 804 presents, via a client device, a variety of types of information, including text, images, video, audio, characters, or other information. Moreover, the user interface manager 804 provides a variety of user interfaces (e.g., the user interface 704) specific to any variety of functions, programs, applications, plug-ins, devices, operating systems, and/or components of a client device.

In addition, as shown in FIG. 8, the digital segmentation system 800 also includes the soft classification training engine 806. The soft classification training engine 806 can train, instruct, or teach a soft classification algorithm to generate a soft classification. In particular, the soft classification training engine 806 can train a soft classification engine to determine one or more soft classification categories based on a three-dimensional digital model. For example, the soft classification training engine 806 can train a soft classification algorithm utilizing training digital models 816*h* and training soft classification categories 816*i*. The soft classification training engine 806 can train a variety of different soft classification algorithms, as described above, including a mixture of experts algorithm or a neural network.

In addition to the soft classification training engine 806, as illustrated in FIG. 8, the digital segmentation system 800 also includes the correspondence detector 808. The correspondence detector 808 can determine, detect, identify, learn, or generate a correspondence between a soft classification category and other factors. For example, the correspondence detector 808 can determine a correspondence between a soft classification category and a soft classification algorithm. Similarly, the correspondence detector 808 can determine a correspondence between a soft classification category and an input parameter.

The correspondence detector 808 can determine a correspondence based on a training digital model, training soft classification categories, and/or known segments. For example, the correspondence detector 808 can repeatedly utilize different segmentation algorithms to predict segments of a training digital model belonging to a known training soft classification category and compare the predicted segments with the known segments. Based on the comparison, the correspondence detector 808 can determine segmentation algorithms that are most accurate in relation to three-dimensional digital models belonging to the soft classification category. Similarly, the correspondence detector 808 can repeatedly utilize a segmentation algorithm with different input parameters to predict segments of a three-dimensional digital model belonging to a known soft classification category and compare the predicted segments with known segments. Based on the comparison, the correspondence detector 808 can determine input parameters that are most accurate in relation to three-dimensional digital models belonging to the soft classification category.

In one or more embodiments, the correspondence detector 808 (and/or the soft classification training engine 806) operate prior to run time (e.g., prior to a user initiating a software application with segmentation capabilities, prior to initiating a tool for segmenting a three-dimensional digital model, or prior to receiving an indication of a selection by a user of a portion of a three-dimensional digital model). In this manner, the digital segmentation system 800 can avoid run time delays and excessive processing power in identifying a segment of a three-dimensional digital model.

In addition, as shown in FIG. 8, the digital segmentation system 800 also includes the soft classification facility 810. The soft classification facility 810 can generate, identify, or determine one or more soft classifications. In particular, the soft classification facility 810 can utilize a soft classification algorithm (e.g., the soft classification algorithm 816*c* trained by the soft classification training engine 806) to generate a soft classification of a three-dimensional digital model. In particular, the soft classification facility 810 can analyze features of the three-dimensional digital model (e.g., light field descriptors) and determine a soft classification corresponding to the three-dimensional digital model.

Further, as shown in FIG. 8, the digital segmentation system 800 also includes the segmentation tuner 812. The segmentation tuner 812 can tune, identify, modify, or select one or more segmentation algorithms. For example, the segmentation tuner 812 can select one or more segmentation algorithms from a plurality of segmentation algorithms based on a soft classification (e.g., the soft classification from the soft classification facility 810 together with a correspondence between the soft classification and one or more segmentation algorithms from the correspondence detector 808). Similarly, the segmentation tuner 812 can combine segmentation parameters from a plurality of segmentation algorithms based on a soft classification. Moreover, the segmentation tuner 812 can determine input parameters for one or more soft classification algorithms based on a soft classification.

Moreover, as shown in FIG. 8, the digital segmentation system 800 also includes the segmentation manager 814. The segmentation manager 814 can identify, select, segregate, separate, or determine one or more segments of a three-dimensional digital model. In particular, the segmentation manager 814 can utilize segmentation algorithms (e.g., segmentation algorithms tuned according to the segmentation tuner 812) to identify a segment of a three-dimensional digital model. To illustrate, the segmentation manager 814 can utilize segmentation parameters to identify a segment of a three-dimensional digital model (e.g., cut a three-dimensional digital model along edges based on edge segmentation scores).

The segmentation manager 814 can also modify one or more segments of a three-dimensional digital model. For instance, the segmentation manger 814 can modify the color, texture, appearance, location, rotation, or shape of a segment of a three-dimensional digital model.

Moreover, as illustrated in FIG. 8, the digital segmentation system 800 also includes the storage manager 816. The storage manager 816 maintains data to perform the functions of the digital segmentation system 800. The storage manager 816 can comprise one or more memories or storage devices to maintain data for the digital segmentation system 800. As illustrated, the storage manager 816 includes the three-dimensional digital models 816a, soft classification categories 816b, soft classification algorithm 816c, segmentation algorithms 816d, input parameters 816e, segmentation parameters 816f, segments 816g (e.g., segments identified by the segmentation manager 814), training digital models 816h, and training soft classification categories 816i.

Each of the components 802-816 of the digital segmentation system 800 (as shown in FIG. 8) may be in communication with one another using any suitable communication technologies. It will be recognized that although components 802-816 of the digital segmentation system 800 are shown to be separate in FIG. 8, any of components 802-816 may be combined into fewer components, such as into a single facility or module, divided into more components, or configured into different components as may serve a particular embodiment.

The components 802-816 of the digital segmentation system 800 can comprise software, hardware, or both. For example, the components 802-816 can comprise one or more instructions stored on a computer-readable storage medium and executable by processors of one or more computing devices. When executed by the one or more processors, the computer-executable instructions of the digital segmentation system 800 can cause a client device and/or a server device to perform the methods described herein. Alternatively, the components 802-816 and their corresponding elements can comprise hardware, such as a special purpose processing device to perform a certain function or group of functions. Additionally, the components 802-816 can comprise a combination of computer-executable instructions and hardware.

Furthermore, the components 802-816 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-816 may be implemented as a stand-alone application, such as a desktop or mobile application. Furthermore, the components 802-816 may be implemented as one or more web-based applications hosted on a remote server. The components 802-816 may also be implemented in a suit of mobile device applications or "apps." To illustrate, the components 802-816 may be implemented in an application, including but not limited to ADOBE PHOTOSHOP software or ADOBE FUSE software. "ADOBE," "PHOTOSHOP," and "FUSE" are either registered trademarks or trademarks of Adobe Systems Incorporated in the United States and/or other countries.

Figure 9:
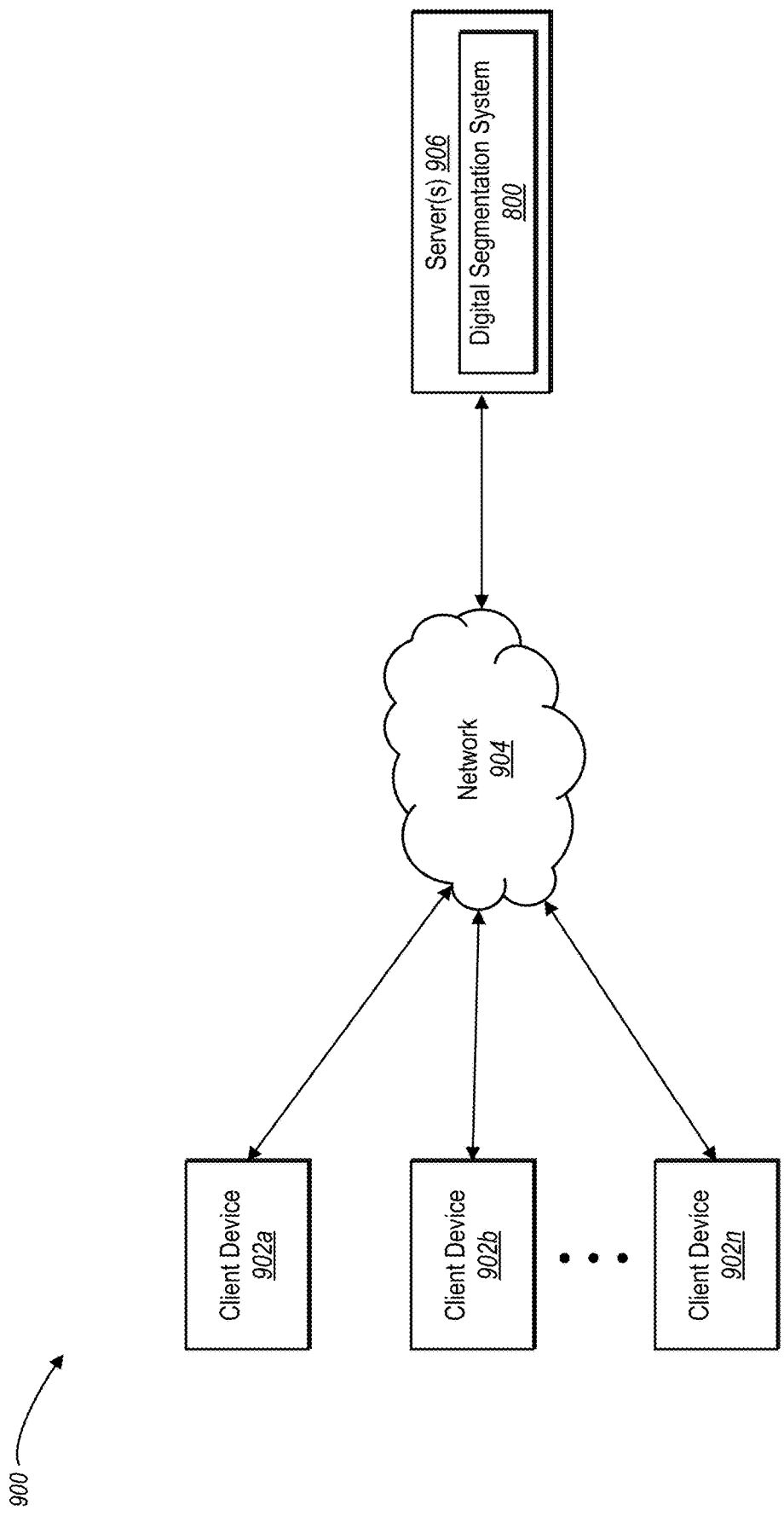
FIG. 9 illustrates a schematic diagram illustrating an exemplary environment in which the digital segmentation system may be implemented in accordance with one or more embodiments.

FIG. 9 illustrates a schematic diagram of one embodiment of an exemplary environment 900 in which the digital segmentation system 800 can operate. In one or more embodiments, the exemplary environment 900 includes one or more client devices 902a, 902b, . . . 902n, a network 904, and server(s) 906. The network 904 may be any suitable network over which the computing devices can communicate. Example networks are discussed in more detail below with regard to FIG. 11.

As illustrated in FIG. 9, the environment 900 may include client devices 902a-902n. The client devices 902a-902n may comprise any computing device. For instance, in one or more embodiments, one or more of the client devices 902a-902n comprise one or more computing devices described below in relation to FIG. 11.

In addition, the environment 900 may also include the server(s) 906. The server(s) 906 may generate, store, receive, and transmit any type of data, including three-dimensional digital models 816a, soft classification categories 816b, soft classification algorithm 816c, segmentation algorithms 816d, input parameters 816e, segmentation parameters 816f, segments 816g, training digital models 816h, and training soft classification categories 816i. For example, the server(s) 906 may transmit data to a client device, such as the client device 902a. The server(s) 906 can also transmit electronic messages between one or more users of the environment 900. In one example embodiment, the server(s) 906 comprise a content server. The server(s) 906 can also comprise a communication server or a web-hosting server. Additional details regarding the server(s) 906 will be discussed below with respect to FIG. 11.

As illustrated, in one or more embodiments, the server(s) 906 can include all, or a portion of, the digital segmentation system 800. In particular, the digital segmentation system 800 can comprise an application running on the server(s) 906 or a portion of a software application that can be downloaded from the server(s) 906. For example, the digital segmentation system 800 can include a web hosting application that allows the client devices 902a-902n to interact with content hosted at the server(s) 906. To illustrate, in one or more embodiments of the exemplary environment 900, one or more client devices 902a-902n can access a webpage supported by the server(s) 906. In particular, the client device 902a can run an application to allow a user to access, view, and/or interact with a webpage or website hosted at the server(s) 906.

Although FIG. 9 illustrates a particular arrangement of the client devices 902a-902n, the network 904, and the server(s) 906, various additional arrangements are possible. For example, while FIG. 9 illustrates multiple separate client devices 902a-902n communicating with the server(s) 906 via the network 904, in one or more embodiments a single client device may communicate directly with the server(s) 906, bypassing the network 904.

Similarly, although the environment 900 of FIG. 9 is depicted as having various components, the environment 900 may have additional or alternative components. For example, the digital segmentation system 800 can be implemented on a single computing device. In particular, the digital segmentation system 800 may be implemented in whole by the client device 902a or the digital segmentation system 800 may be implemented in whole by the server(s) 906. Alternatively, the digital segmentation system 800 may be implemented across multiple devices or components (e.g., utilizing the client devices 902a-902n and the server(s) 906).

By way of example, in one or more embodiments, the client device 902a accesses a three-dimensional digital model stored on the server(s) 906. The client device 902a receives user input (e.g., via the user input detector 802) of a selection of a portion of the three-dimensional digital model and provides an indication of the selection to the server(s) 906. The server(s) 906 analyze the three-dimensional digital model and determine a soft classification corresponding to the three-dimensional digital model (e.g., via the soft classification facility 810). Based on the three-dimensional digital model, the server(s) 906 tune one or more segmentation algorithms (e.g., via the segmentation tuner 812) and utilize the one or more segmentation algorithms to identify a segment of the three-dimensional digital model corresponding to the selection (e.g., via the segmentation manager 814). The server(s) 906 send an indication of the segment to the client device 902a and the client device 902a provides the segment of the three-dimensional digital model for display via a user interface to the user (e.g., via the user interface manager 804). Furthermore, the client device 902a modifies the segment based on user interaction with the segment (e.g., via the segmentation manager 814).

Furthermore, in one or more embodiments, the server(s) 906 also train a soft classification algorithm and determine a correspondence between soft classification categories and segmentation algorithms and/or input parameters (e.g., prior to receiving an indication of a selection of the three-dimensional digital model from the client device 902a). For example, the server(s) 906 can train a soft classification algorithm utilizing training digital models and training soft classification categories such that the soft classification algorithm can determine a soft classification corresponding to a three-dimensional digital model (e.g., via the soft classification training engine 806). Similarly, the server(s) 906 can utilize training digital models, known classification categories, and/or known segments to identify a correspondence between a soft classification category and a segmentation algorithm and/or a correspondence between a soft classification category and one or more input parameters (e.g., via the correspondence detector 808).

Figure 10:
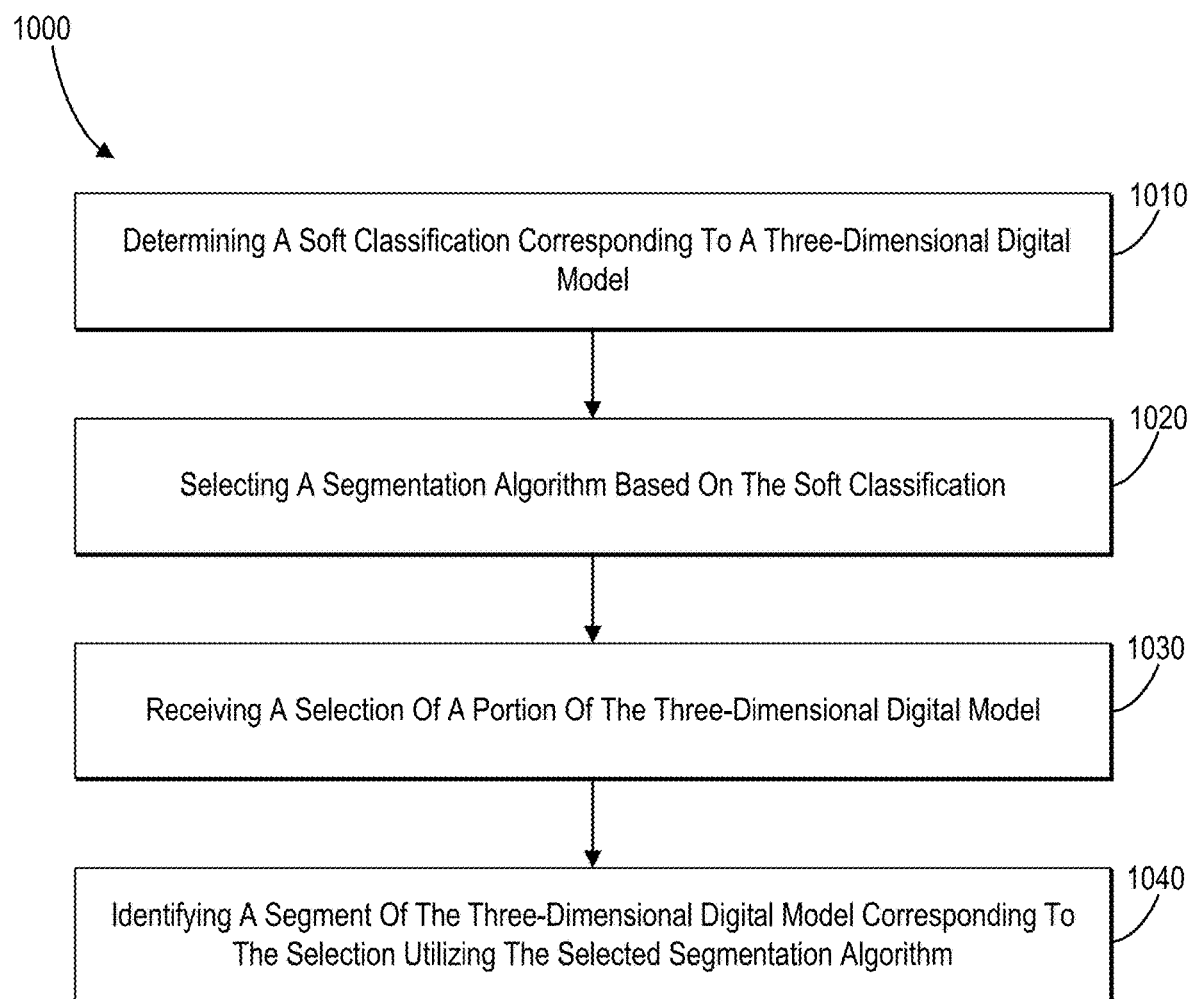
FIG. 10 illustrates a flowchart of a series of acts in a method of identifying a segment of a three-dimensional digital model utilizing a soft classification in accordance with one or more embodiments.

FIGS. 1-9, the corresponding text, and the examples, provide a number of different systems and devices for identifying a segment of a three-dimensional digital model based on a soft classification. In addition to the foregoing, embodiments can also be described in terms of flowcharts comprising acts in a method for accomplishing a particular result. For example, FIG. 10 illustrates a flowchart of an exemplary method in accordance with one or more embodiments. The methods described in relation to FIG. 9 may be performed with less or more steps/acts or the steps/acts may be performed in differing orders. Additionally, the steps/acts described herein may be repeated or performed in parallel with one another or in parallel with different instances of the same or similar steps/acts.

FIG. 10 illustrates a flowchart of a series of acts in a method 1000 of utilizing a soft classification to identify a segment of a three-dimensional digital image in accordance with one or more embodiments. In one or more embodiments, the method 1000 is performed in a digital medium environment that includes the digital segmentation system 800. The method 1000 is intended to be illustrative of one or more methods in accordance with the present disclosure, and is not intended to limit potential embodiments. Alternative embodiments can include additional, fewer, or different steps than those articulated in FIG. 10.

As illustrated in FIG. 10, the method 1000 includes an act 1010 of determining a soft classification corresponding to a three-dimensional digital model. In particular, the act 1010 can include determining a soft classification corresponding to a three-dimensional digital model by analyzing features of the three-dimensional digital model based on a plurality of training digital models and training soft classification categories. For example, in one or more embodiments, the act 1010 includes determining, for each soft classification category of a plurality of soft classification categories, a probability that that the three-dimensional digital model corresponds to the soft classification category.

Moreover, in one or more embodiments, the act 1010 also includes determining the soft classification corresponding to the three-dimensional digital model utilizing a soft classification algorithm. Furthermore, the act 1010 can also include training the soft classification algorithm prior to receiving the indication of the selection by: providing the training digital models to the soft classification algorithm; for each training digital model, utilizing the soft classification algorithm to predict at least one soft classification category corresponding to the training digital model; and for each training digital model, comparing the at least one predicted soft classification category with the training soft classification category corresponding to the training digital model.

Moreover, as shown in FIG. 10, the method 1000 also includes an act 1020 of selecting a segmentation algorithm based on the soft classification. In particular, the act 1020 can include selecting a segmentation algorithm from a plurality of segmentation algorithms based on the soft classification corresponding to the three-dimensional digital model. For example, the act 1020 can include determining a correspondence between a soft classification category of the plurality of soft classification categories and the segmentation algorithm. Moreover, in one or more embodiments, the act 1020 also includes comparing a first probability, from the soft classification, that the three-dimensional digital model corresponds to the soft classification category with a second probability, from the soft classification, that the three-dimensional digital model corresponds to a second soft classification category.

In one or more embodiments, the act 1020 comprises selecting a first segmentation algorithm based on a first probability from the soft classification; and selecting a second segmentation algorithm based on a second probability from the soft classification. In addition, the act 1020 can include generating a first segmentation parameter for the three-dimensional digital model utilizing the segmentation algorithm; generating a second segmentation parameter for the three-dimensional digital model utilizing the second segmentation algorithm; and generating a mixed segmentation parameter based on the first probability, the second probability, the first segmentation parameter, and the second segmentation parameter.

For example, in one or more embodiments, the first segmentation parameter comprises a first edge segmentation score corresponding to an edge of the three-dimensional digital model, wherein the first edge segmentation score reflects a cost of cutting the three-dimensional digital model at the edge; the second segmentation parameter comprises a second edge segmentation score corresponding to the edge of the three-dimensional digital model, wherein the second edge segmentation score reflects a second cost of cutting the three-dimensional digital model at the edge; and the mixed segmentation parameter comprises a mixed edge segmentation score reflecting a combination of the first edge segmentation score and the second edge segmentation score based on the first probability and the second probability.

Further, in one or more embodiments, the act 1020 includes comparing a probability threshold with a first probability, from the soft classification, that the three-dimensional digital model corresponds to a first classification category; and in response to a determination that the first probability exceeds the probability threshold, selecting the segmentation algorithm and excluding the remainder of the plurality of segmentation algorithms in identifying the segment of the three-dimensional digital model.

In addition, the act 1020 can also include determining an input parameter based on the soft classification.

Furthermore, as shown in FIG. 10, the method 1000 also includes an act 1030 of receiving a selection of a portion of the three-dimensional digital model. In particular, the act 1030 can include receiving an indication of a selection of a portion of the three-dimensional digital model.

In addition, as shown in FIG. 10, the method 1000 also includes an act 1040 of identifying a segment of the three-dimensional digital model corresponding to the selection utilizing the selected segmentation algorithm. In particular, the act 1030 can include identifying the segment of the three-dimensional digital model utilizing the mixed segmentation parameter. Moreover, in one or more embodiments, the act 1030 comprises utilizing the selected input parameter determined based on the soft classification to identify the segment of the three-dimensional digital model In one or more embodiments, the method 1000 also includes modifying the identified segment of the three-dimensional digital model. For example, modifying the identified segment of the three-dimensional digital model can comprise at least one of: modifying a color of the segment, modifying a shape of the segment, or modifying a location of the segment Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
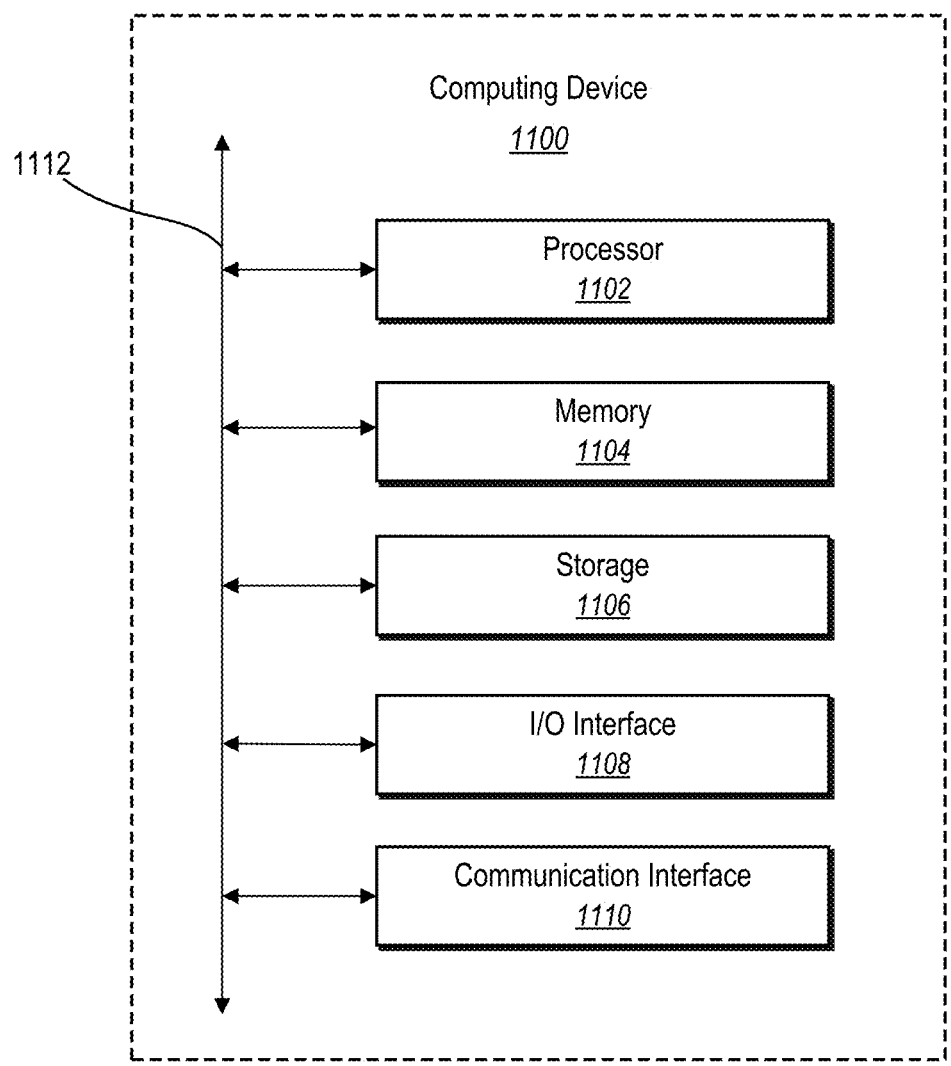
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that the digital segmentation system 800 can comprise implementations of the computing device 1100. As shown by FIG. 11, the computing device can comprise a processor 1102, memory 1104, a storage device 1106, an I/O interface 1108, and a communication interface 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a stylus or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A computer-implemented method for manipulating segments of three-dimensional digital models, comprising:
   determining a soft classification of a three-dimensional digital model utilizing a classification algorithm;
   generating segmentation parameters for the three-dimensional digital model utilizing multiple segmentation algorithms;
   generating combined segmentation parameters by combining the segmentation parameters from the multiple segmentation algorithms utilizing the soft classification of the three-dimensional digital model; and
   identifying a segment of the three-dimensional digital model utilizing the combined segmentation parameters.

2. The computer-implemented method of claim 1, further comprising determining the soft classification of the three-dimensional digital model by:
   determining a first probability of a first soft classification and a second probability of a second soft classification utilizing the classification algorithm; and
   combining the segmentation parameters utilizing the first probability and the second probability.

3. The computer-implemented method of claim 2, wherein combining the segmentation parameters utilizing the first probability and the second probability comprises:

utilizing the first probability to determine a first mixture coefficient for a first set of segmentation parameters generated utilizing a first segmentation algorithm;

utilizing the second probability to determine a second mixture coefficient for a second set of segmentation parameters generated utilizing a second segmentation algorithm; and combining the first set of segmentation parameters and the second set of segmentation parameters utilizing the first mixture coefficient and the second mixture coefficient.

4. The computer-implemented method of claim 2, further comprising utilizing the first probability and the second probability to combine the segmentation parameters in response to determining that the first probability and the second probability satisfy a probability threshold.

5. The computer-implemented method of claim 1, further comprising:

selecting a first input parameter of a first segmentation algorithm of the multiple segmentation algorithms based on the soft classification; and selecting a second input parameter for a second segmentation algorithm of the multiple segmentation algorithms based on the soft classification.

6. The computer-implemented method of claim 5, further comprising:

utilizing the first input parameter of the first segmentation algorithm to generate a first set of segmentation parameters of the segmentation parameters; and utilizing the second input parameter of the second segmentation algorithm to generate a second set of segmentation parameters of the segmentation parameters.

7. The computer-implemented method of claim 1, wherein identifying the segment of the three-dimensional digital model comprises:

receiving a user selection of a portion of the three-dimensional digital model; and determining a selected segment corresponding to the user selection utilizing the combined segmentation parameters.

8. The computer-implemented method of claim 1, wherein generating the segmentation parameters comprises generating a first set of edge segmentation scores utilizing a first segmentation algorithm and generating a second set of edge segmentation scores utilizing a second segmentation algorithm.

9. A non-transitory computer readable medium storing instructions, that when executed by at least one processor, cause a computer system to:

determine a soft classification of a three-dimensional digital model utilizing a classification algorithm;

generate a first set of edge segmentation scores for the three-dimensional digital model utilizing a first segmentation algorithm;

generate a second set of edge segmentation scores for the three-dimensional digital model utilizing a second segmentation algorithm;

generate a combined set of edge segmentation scores by combining the first set of edge segmentation scores and the second set of edge segmentation scores based on the soft classification; and segment the three-dimensional digital model utilizing the combined set of edge segmentation scores.

10. The non-transitory computer readable medium of claim 9, further comprising instructions that, when executed by the at least one processor, cause the computer system to:

select a first input parameter of the first segmentation algorithm based on the soft classification; and generate the first set of edge segmentation scores utilizing the first input parameter and the first segmentation algorithm.

11. The non-transitory computer readable medium of claim 10, further comprising instructions that, when executed by the at least one processor, cause the computer system to:

select a second input parameter of the second segmentation algorithm based on the soft classification; and generate the second set of edge segmentation scores utilizing the second input parameter and the second segmentation algorithm.

12. The non-transitory computer readable medium of claim 9, further comprising instructions that, when executed by the at least one processor, cause the computer system to determine the soft classification of the three-dimensional digital model by:

determining a first probability of a first soft classification utilizing the classification algorithm; and determining a second probability of a second soft classification utilizing the classification algorithm.

13. The non-transitory computer readable medium of claim 12, further comprising instructions that, when executed by the at least one processor, further cause the computer system to:

utilize the first probability to determine a first mixture coefficient for the first set of edge segmentation scores;

utilizing the second probability to determine a second mixture coefficient for the second set of edge segmentation scores; and mix the first set of edge segmentation scores and the second set of edge segmentation scores by applying the first mixture coefficient to the first set of edge segmentation scores and applying the second mixture coefficient to the second set of edge segmentation scores.

14. The non-transitory computer readable medium of claim 9, further comprising instructions that, when executed by the at least one processor, further cause the computer system to:

identify a correspondence between the soft classification, the first segmentation algorithm, and the second segmentation algorithm; and in response to determining the soft classification of the three-dimensional digital model utilizing the classification algorithm, selecting the first segmentation algorithm and the second segmentation algorithm from a plurality of segmentation algorithms based on the correspondence.

15. A system comprising:

one or more memory devices; and one or more servers that are configured to cause the system to:

determine a soft classification for a three-dimensional digital model utilizing a classification algorithm;

generate segmentation parameters for the three-dimensional digital model utilizing multiple segmentation algorithms;

generate combined segmentation parameters by combining the segmentation parameters from the multiple segmentation algorithms utilizing the soft classification of the three-dimensional digital model; and identify a segment of the three-dimensional digital model utilizing the combined segmentation parameters.

16. The system of claim 15, wherein the one or more servers are further configured to select the multiple segmentation algorithms from a plurality of segmentation algorithms based on the soft classification for the three-dimensional digital model.

17. The system of claim 15, wherein the one or more servers are further configured to:
   select a first input parameter of a first segmentation algorithm of the multiple segmentation algorithms based on the soft classification;
   select a second input parameter for a second segmentation algorithm of the multiple segmentation algorithms based on the soft classification;
   utilize the first input parameter of the first segmentation algorithm to generate a first set of segmentation parameters; and
   utilize the second input parameter of the second segmentation algorithm to generate a second set of segmentation parameters.

18. The system of claim 15, wherein the one or more servers are further configured to determine the soft classification by:
   determining a first probability of a first soft classification and a second probability of a second soft classification utilizing the classification algorithm;
   determining a first mixture coefficient and a second mixture coefficient utilizing the first probability and the second probability; and
   combining the segmentation parameters utilizing the first mixture coefficient and the second mixture coefficient.

19. The system of claim 15, wherein the one or more servers are further configured to generate the combined segmentation parameters by generating a combined set of edge segmentation scores.

20. The system of claim 19, wherein the one or more servers are further configured to:
   identify a user selection of a portion of the three-dimensional digital model; and
   utilize the combined set of edge segmentation scores to determine a selected segment of the three-dimensional digital model corresponding to the user selection.

* * * * *